US008515591B2

(12) United States Patent
Yokota

(10) Patent No.: US 8,515,591 B2
(45) Date of Patent: Aug. 20, 2013

(54) DEVICE FOR ESTIMATING TURNING CHARACTERISTIC OF VEHICLE

(75) Inventor: Takahiro Yokota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/389,701

(22) PCT Filed: Sep. 24, 2009

(86) PCT No.: PCT/JP2009/067127
§ 371 (c)(1),
(2), (4) Date: Feb. 9, 2012

(87) PCT Pub. No.: WO2011/036820
PCT Pub. Date: Mar. 31, 2011

(65) Prior Publication Data
US 2012/0173040 A1   Jul. 5, 2012

(51) Int. Cl.
G06F 17/00   (2006.01)
B60W 40/12  (2012.01)
B60W 40/10  (2012.01)

(52) U.S. Cl.
USPC .................................................. 701/1; 703/2

(58) Field of Classification Search
USPC ..................................... 701/1, 36, 41; 703/2
See application file for complete search history.

(56) References Cited

U.S. PATENT DOCUMENTS

| 7,031,808 | B2 * | 4/2006 | Tanimoto et al. | 701/1 |
| 7,317,982 | B2 * | 1/2008 | Tsukasaki et al. | 701/70 |
| 7,577,504 | B2 * | 8/2009 | Sawada et al. | 701/38 |
| 7,647,150 | B2 * | 1/2010 | Katayama | 701/43 |
| 2004/0002795 | A1 | 1/2004 | Tanimoto et al. | |
| 2006/0169522 | A1 | 8/2006 | Katayama | |
| 2010/0114449 | A1 * | 5/2010 | Shiozawa et al. | 701/90 |
| 2012/0173039 | A1 * | 7/2012 | Yokota | 701/1 |

FOREIGN PATENT DOCUMENTS

| EP | 1 375 281 A1 | 1/2004 |
| JP | A-10-258720 | 9/1998 |
| JP | A-2000-95085 | 4/2000 |
| JP | A-2004-26073 | 1/2004 |
| JP | A-2004-26074 | 1/2004 |
| JP | A-2005-8066 | 1/2005 |

(Continued)

OTHER PUBLICATIONS

International Search Report dated Jan. 19, 2010 in International Application No. PCT/JP2009/067127 (with translation).

Primary Examiner — Russell Frejd
(74) Attorney, Agent, or Firm — Oliff & Berridge, PLC

(57) ABSTRACT

A device for estimating a turning characteristic of a vehicle estimates a stability factor indicating the turning characteristic of a vehicle. The device for estimating the turning characteristic calculates the transient yaw rate of a vehicle involved in the relationship of a primary delay relative to the steady-state standard yaw rate of a vehicle, and calculates the deviation between the transient yaw rate of the vehicle and the actual yaw rate of the vehicle. The device for estimating the turning characteristic corrects the estimated value of the stability factor so as to approach the true stability factor by correcting the initial value of the stability factor supplied to the calculation of the standard yaw rate of the vehicle on the basis of the relationship between the deviation of the yaw rate and the lateral acceleration of the vehicle so that the transient yaw rate of the vehicle approaches the true yaw rate.

12 Claims, 16 Drawing Sheets

(56) References Cited

FOREIGN PATENT DOCUMENTS

| JP | A-2005-8067 | 1/2005 |
| JP | A-2006-27388 | 2/2006 |
| JP | A-2006-168630 | 6/2006 |
| JP | A-2009-119921 | 6/2009 |
| JP | A-2009-137512 | 6/2009 |
| JP | A-2009-274507 | 11/2009 |

* cited by examiner

FIG.21
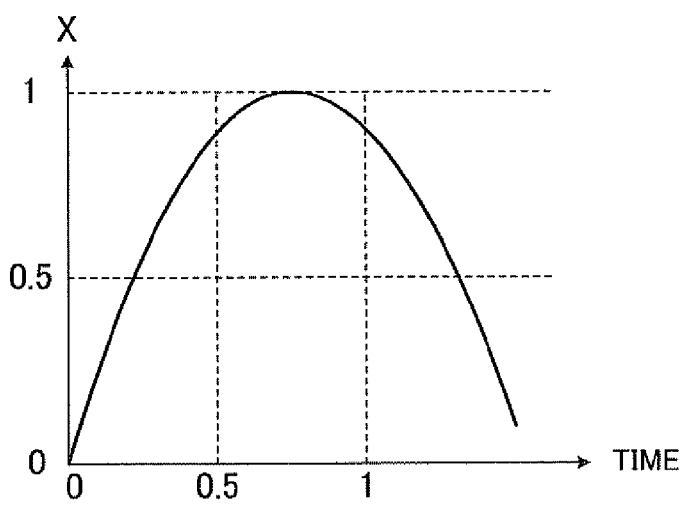
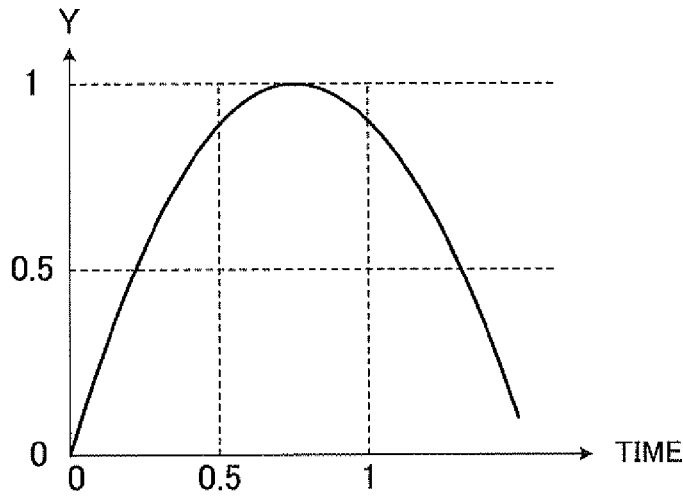
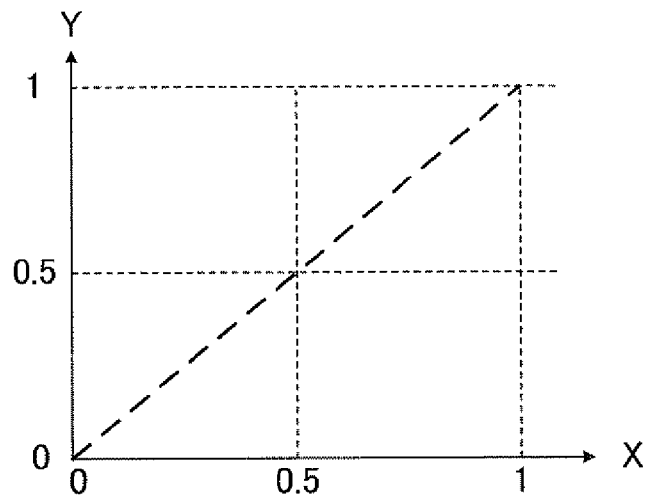

FIG.22
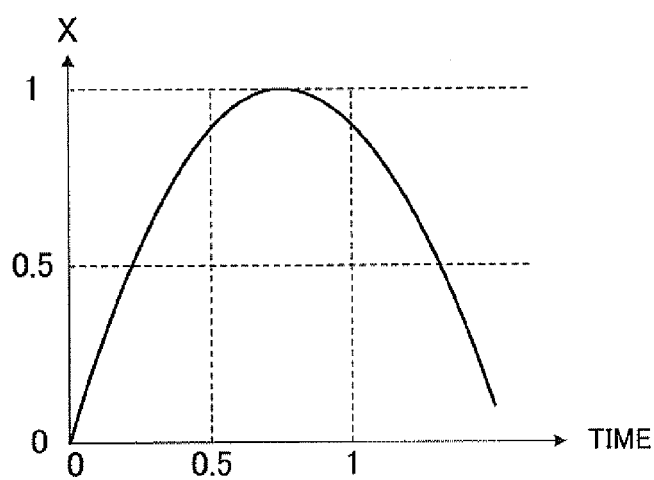
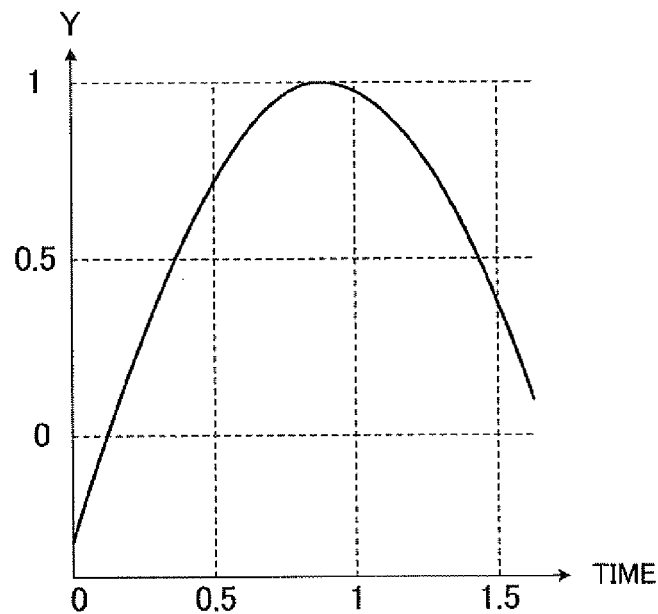
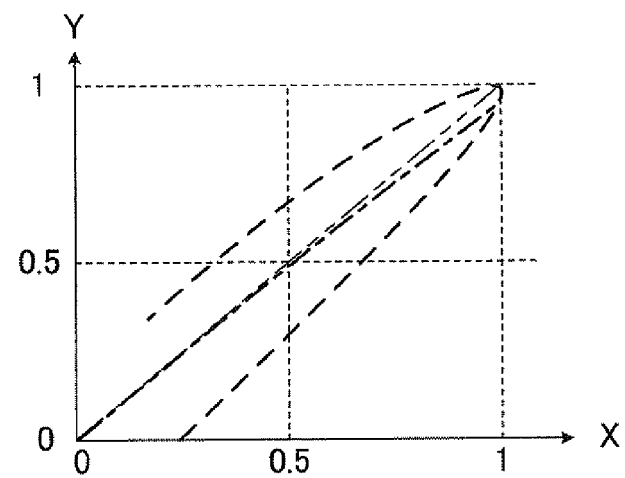

FIG.23
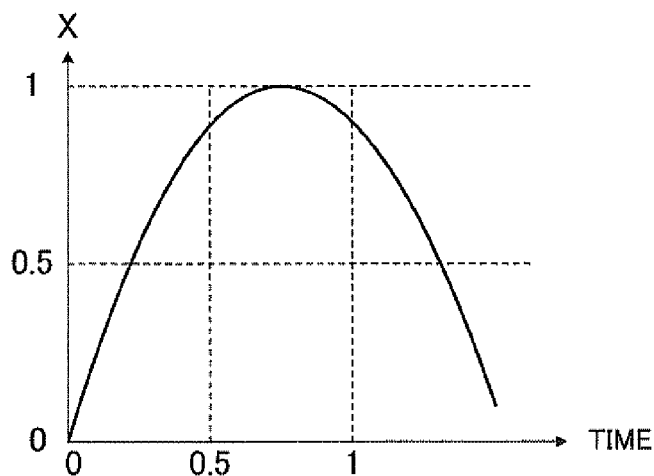
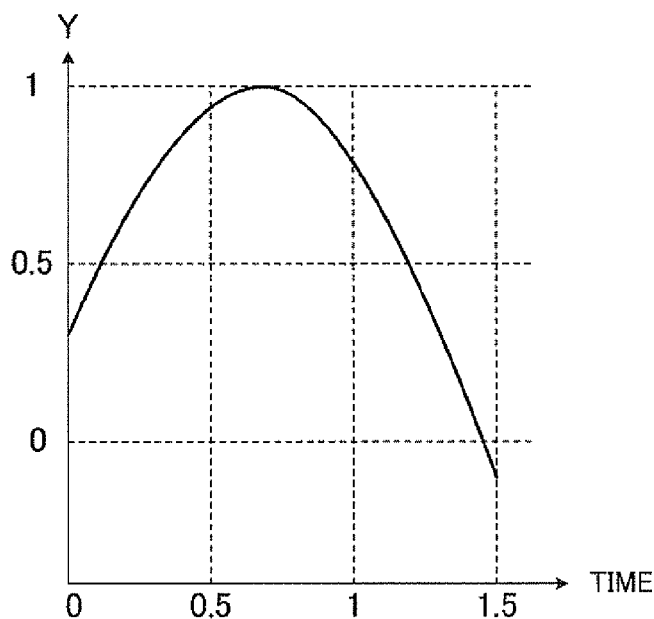
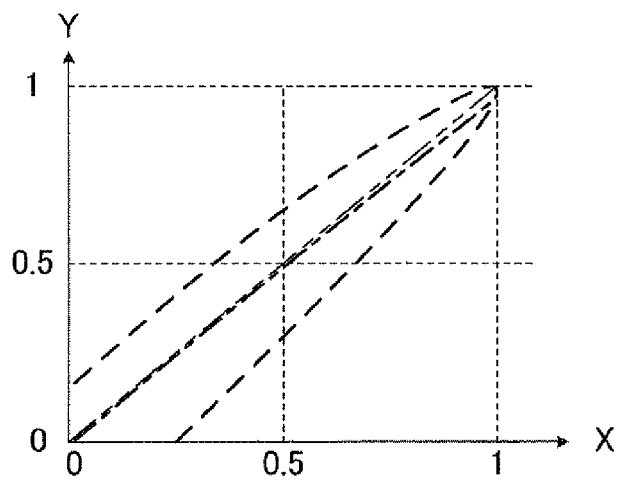

DEVICE FOR ESTIMATING TURNING CHARACTERISTIC OF VEHICLE

TECHNICAL FIELD

The present invention relates to a device for estimating the turning characteristic of a vehicle and, more particularly, to a device for a vehicle which estimates a stability factor of the vehicle that represents the turning characteristic of a vehicle on the basis of a standard yaw rate of the vehicle and a transient yaw rate of the vehicle when the vehicle turns.

BACKGROUND ART

Assume that an actual yaw rate of a vehicle has a relationship of first order delay to a standard yaw rate of the vehicle and a coefficient multiplied to a vehicle speed in a time constant of the first order delay is referred to a time constant coefficient of steering response. A stability factor of the vehicle and a time constant coefficient of steering response t represent a turning characteristic of the vehicle. A stability factor of the vehicle and a steering-response-time constant coefficient can be estimated by using ARX (auto-regressive exogenous model) to estimate parameters a and b of a discrete-time transfer function from a standard yaw rate of the vehicle to an actual yaw rate of a vehicle.

In, for example, Japanese Patent Application Laid-Open (kokai) No. 2004-26074, a turning characteristic estimating device for a vehicle is described which estimates a standard yaw rate of a vehicle on the basis of running data when the vehicle turns; estimates parameters a and b of a discrete-time transfer function from a standard yaw rate of the vehicle to an actual yaw rate of the vehicle; estimates an estimation error ΔKh of stability factor of the vehicle on the basis of the parameters a, b and vehicle speed V; and sets the sum of an initial value of stability factor and the estimation error Δkh to an estimated value of stability factor of the vehicle.

The state values of a vehicle for calculating a standard yaw rate and an actual yaw rate are detected by sensors, the detected values of which can include detection error due to zero point offset of the sensors or the like. For that reason, in the conventional turning characteristic estimating devices such as that disclosed in the above-mentioned Laid-Open Publication, estimation of stability factor is liable to be affected by the detection error, which precludes enhancing estimation accuracy of stability factor.

DISCLOSURE OF THE INVENTION

In view of such a problem as described above in conventional turning characteristic estimating devices, it is a primary object of the present invention to estimate a stability factor with higher accuracy than so far by correcting an estimated value of stability factor by learning so that the estimated value of stability factor approach a true stability factor while depressing the influence of detection error on the basis of the difference between a transient yaw rate of a vehicle involved in the relationship of a primary delay relative to the steady-state standard yaw rate of a vehicle and an actual yaw rate and lateral acceleration of the vehicle.

The present invention provides a turning characteristic estimation device for a vehicle, wherein the device estimates a stability factor of the vehicle on the basis of the relationship between vehicle lateral acceleration removed of the components having frequency equal to or lower than a first predetermined value and yaw rate deviation index value removed of the components having frequency equal to or lower than a second predetermined value which is indexes the deviation between a transient yaw rate of the vehicle having a relationship of first order delay relative to a standard yaw rate of the vehicle and an actual yaw rate of the vehicle.

It is possible to remove steady detection errors such as those due to zero point offset of detection means for detecting a lateral acceleration of the vehicle by removing components having a frequency which is not larger than a prescribed value from detected value of lateral acceleration of the vehicle. Similarly, it is possible to remove steady detection errors such as those due to zero point offset of detection means for detecting a state quantity of the vehicle by removing components having a frequency which is not larger than a prescribed value from a value for calculating a yaw rate deviation index value.

As described in detail later, calculation of index value of deviation between a transient yaw rate of a vehicle involved in the relationship of a primary delay relative to the steady-state standard yaw rate of the vehicle and an actual yaw rate and lateral acceleration of the vehicle enables to estimate a stability factor of the vehicle on the basis of the relationship between a lateral acceleration of the vehicle and the index value of yaw rate deviation.

According to the above-mentioned configuration, a stability factor of the vehicle is estimated on the basis of the relationship between vehicle lateral acceleration removed of the components having frequency equal to or lower than a first predetermined value and yaw rate deviation index value removed of the components having frequency equal to or lower than a second predetermined value. Accordingly, a stability factor can be estimated on the basis of vehicle lateral acceleration and yaw rate deviation index value which are reduced in steady detection error such as those due to zero point offset, whereby a stability factor can be estimated with higher accuracy than ever before.

It is not necessary to estimate parameters of a discrete-time transfer function from a standard yaw rate to an actual yaw rate, which enables to estimate a stability factor within a shorter time than ever before.

The above-mentioned configuration may be such that: the device acquires information of vehicle lateral acceleration and yaw rate deviation index value over a plurality of times and estimates a stability factor of the vehicle on the basis of the relationship between an integrated value of vehicle lateral acceleration removed of the components having frequency equal to or lower than a first predetermined value and an integrated value of yaw rate deviation index value removed of the components having frequency equal to or lower than a second predetermined value.

According to this configuration, the relationship between vehicle lateral acceleration and yaw rate deviation index value can be acquired irrespective of the phase difference between vehicle lateral acceleration and yaw rate deviation index value. Accordingly, a stability factor can be estimated with higher accuracy as compared with a case where a stability factor is estimated on the basis of the relationship between vehicle lateral acceleration and yaw rate deviation index value irrespective of the phase difference therebetween.

The above-mentioned configuration may be such that: the device calculates a first adjusting gain in accordance with the change degree of the estimated value of stability factor; sets a sum of a previous integrated value of vehicle lateral acceleration multiplied by the first gain and vehicle lateral acceleration acquired this time to the present integrated value of yaw rate deviation index value; and estimates a stability factor of the vehicle on the basis of the relationship between the present integrated value of vehicle lateral acceleration and the present integrated value of yaw rate deviation index value.

According to this configuration, the integrated value of vehicle lateral acceleration and the integrated value of yaw rate deviation index value can appropriately be calculated in accordance with the change degree of the estimated value of stability factor. Accordingly, even when the change degree of the estimated value of stability factor is high, a stability factor can be estimated with higher accuracy as compared with a case where a first adjusting gain is not calculated in accordance with the change degree of the estimated value of stability factor.

The above-mentioned configuration may be such that: the device estimates a time constant coefficient of steering response which is a coefficient multiplied to a vehicle speed in a time constant of the first order delay on the basis of the relationship between transient yaw rate of the vehicle and actual yaw rate of the vehicle so that transient yaw rate of the vehicle approaches actual yaw rate of the vehicle; calculates a second adjusting gain in accordance with the change degree of the estimated value of time constant coefficient of steering response; sets a sum of a previous integrated value of vehicle lateral acceleration multiplied by the second gain and vehicle lateral acceleration acquired this time to the present integrated value of vehicle lateral acceleration; sets a sum of a previous integrated value of yaw rate deviation index value multiplied by the second gain and yaw rate deviation index value acquired this time to the present integrated value of yaw rate deviation index value; and estimates a stability factor of the vehicle on the basis of the relationship between the present integrated value of vehicle lateral acceleration and the present integrated value of yaw rate deviation index value.

According to this configuration, a time constant coefficient of steering response is estimated on the basis of the relationship between transient yaw rate of the vehicle and actual yaw rate of the vehicle so that transient yaw rate of the vehicle approaches actual yaw rate of the vehicle. Accordingly, even when vehicle loading condition or the like varies, transient yaw rate of the vehicle can be calculated with higher accuracy as compared with a case where a time constant coefficient of steering response is set constant.

A second adjusting gain is calculated in accordance with the change degree of the estimated value of time constant coefficient of steering response and a sum of a previous integrated value of vehicle lateral acceleration multiplied by the second gain and vehicle lateral acceleration acquired this time is set to the present integrated value of vehicle lateral acceleration. A sum of a previous integrated value of yaw rate deviation index value multiplied by the second gain and yaw rate deviation index value acquired this time is set to the present integrated value of yaw rate deviation index value. Accordingly, even when the change degree of the estimated value of time constant coefficient of steering response is high, a stability factor can be estimated with higher accuracy as compared with a case where a second adjusting gain is not calculated in accordance with the change degree of the estimated value of time constant coefficient of steering response.

The above-mentioned configuration may be such that: the device calculates a first adjusting gain in accordance with the change degree of the estimated value of stability factor; estimates a time constant coefficient of steering response which is a coefficient multiplied to a vehicle speed in a time constant of the first order delay on the basis of the relationship between transient yaw rate of the vehicle and actual yaw rate of the vehicle so that transient yaw rate of the vehicle approaches actual yaw rate of the vehicle; calculates a second adjusting gain in accordance with the change degree of the estimated value of time constant coefficient of steering response; determines a final adjusting gain on the basis of the first and the second adjusting gains; sets a sum of a previous integrated value of vehicle lateral acceleration multiplied by the final gain and vehicle lateral acceleration acquired this time to the present integrated value of vehicle lateral acceleration; sets a sum of a previous integrated value of yaw rate deviation index value multiplied by the final gain and yaw rate deviation index value acquired this time to the present integrated value of yaw rate deviation index value; and estimates a stability factor of the vehicle on the basis of the relationship between the present integrated value of vehicle lateral acceleration and the present integrated value of yaw rate deviation index value.

According to this configuration, a time constant coefficient of steering response is estimated on the basis of the relationship between transient yaw rate of the vehicle and actual yaw rate of the vehicle so that transient yaw rate of the vehicle approaches actual yaw rate of the vehicle. Accordingly, even when vehicle loading condition or the like varies, transient yaw rate of the vehicle can be calculated with higher accuracy as compared with a case where a time constant coefficient of steering response is set constant.

According to this configuration, even when the change degree of the estimated values of stability factor and time constant coefficient of steering response are high, a stability factor can be estimated with higher accuracy as compared with a case where a final adjusting gain is not determined on the basis of the first and the second adjusting gains.

The above-mentioned configuration may be such that: the yaw rate deviation index values is calculated as a value in which the difference between transient yaw rate and actual yaw rate is transferred to steered angle deviation of the front wheels.

As described in detail later, although the magnitude of a difference between a transient yaw rate of a vehicle and an actual yaw rate of the vehicle is dependent on vehicle speed, the value in which the magnitude of a difference between a transient yaw rate of a vehicle and an actual yaw rate of the vehicle is transferred to the magnitude of steered angle deviation of the front wheels is not dependent on vehicle speed. It is to be noted that steered angle deviation of the front wheels is a difference between steered angle of the front wheels for achieving a transient yaw rate of a vehicle and an actual steered angle of the front wheels.

According to above-described configuration, estimated value of a time constant coefficient of steering response can be derived on the basis of the yaw rate deviation index values which are not dependent on vehicle speed, so that a time constant coefficient of steering response can be estimated without being affected by vehicle speed. The necessity can be removed to estimate stability factor of the vehicle in each vehicle speed.

The above-mentioned configuration may be such that: the device varies the first prescribed frequency and/or the second prescribed frequency according to an index value of the number of reciprocating steering operations by a driver per unit time.

The above-mentioned configuration may be such that: the device varies said first prescribed frequency and/or said second prescribed frequency according to an index value of the number of reciprocating steering operations by a driver per unit time.

Steady detection errors such as zero point offsets in detecting means for detecting state quantities of the vehicle and an actual yaw rate of the vehicle vary according to the number of reciprocating steering operations by a driver per unit time. According to the above-described configuration, steady detection errors can properly be removed in accordance with the number of reciprocating steering operations by a driver per unit time.

The above-mentioned configuration may be such that: the device varies the first prescribed frequency and/or said second prescribed frequency according to a magnitude of lateral acceleration of the vehicle.

Steady detection errors such as zero point offsets in detecting means for detecting such state quantities of the vehicle and an actual yaw rate of the vehicle vary according to the magnitude of vehicle speed change, i.e. the magnitude of longitudinal acceleration of the vehicle. According to the above-described configuration, steady detection errors can properly be removed in accordance with the magnitude of longitudinal acceleration of a vehicle.

The above-mentioned configuration may be such that: the device estimates a stability factor of the vehicle individually for clockwise turning and counter-clockwise turning.

According to this configuration, a stability factor of the vehicle can be estimated for both clockwise turning and counter-clockwise turning even when turning characteristic differs according to turning direction of the vehicle for the reason, for example, that gravity center is not at the center in lateral direction of the vehicle or the position of gravity center varies so much in lateral direction of the vehicle.

The above-mentioned configuration may be such that: the device estimates a stability factor of the vehicle individually for each area of lateral acceleration of the vehicle.

The magnitude of a difference between transient yaw rate of the vehicle and actual yaw rate of the vehicle varies according to magnitude of lateral acceleration of the vehicle. According to above-described configuration, a stability factor of the vehicle can be estimated for each area of lateral acceleration, so that a time constant coefficient of steering response can be estimated without being affected by magnitude of lateral acceleration of the vehicle.

The above-mentioned configuration may be such that: the device adds an adjustment value of stability factor based on the relationship between the integrated value of vehicle lateral acceleration and the integrated value of yaw rate deviation index value to an initial value of stability factor utilized in calculation of the transient yaw rate of the vehicle to calculate the estimated value of stability factor.

The adjustment value of stability factor based on the relationship between the integrated value of vehicle lateral acceleration and the integrated value of yaw rate deviation index value is a correction value for correcting the value of the stability factor which was utilized in calculation of a transient yaw rate of the vehicle to approximate the estimated value of stability factor to a true stability factor. Accordingly, the estimated value of stability factor can be approximated to a true stability factor by correcting the value of the stability factor which was utilized in calculation of a transient yaw rate of the vehicle.

The present invention also provides a vehicle motion controller for executing a vehicle motion control utilizing a stability factor estimated by the device according to any one of claims 1-10, wherein said vehicle motion controller varies a dead zone of said vehicle motion control in accordance with a convergence degree of the estimated value of stability factor.

A convergence degree of the estimated value of stability factor, that is, the magnitude of the varying range of each estimated value corresponds to the accuracy in estimating a stability factor. According to this configuration, a dead zone of vehicle motion control can be changed in accordance with the accuracy in estimating a stability factor.

In a two wheel model of a vehicle shown in FIG. 18, the mass and yaw inertia moment of a vehicle are denoted by M and I, respectively; the distances between a gravity center 102 of the vehicle and between front wheel axle and rear wheel axle are denoted by Lf and Lr, respectively; and wheel base of the vehicle is denoted by L (=Lf+Lr). Cornering forces of a front vehicle wheel 100f and rear vehicle wheel 100r are denoted by Ff and Fr, respectively and Cornering powers of the front wheel and the rear wheel are denoted by Kf and Kr, respectively. Actual steered angle of the front wheel 1 100f is denoted by δ; slip angles of the front wheel and the rear wheel are denoted by $β_f$ and $β_r$, respectively; and slip angle of the vehicle body is denoted by β. Lateral acceleration of the vehicle is denoted by Gy; yaw rate of the vehicle is denoted by γ; vehicle speed is denoted by V and yaw angular acceleration of the vehicle (differential value of yaw rate γ) is denoted by γd. Under-described equations 1 to 6 are derived from the equilibrium of forces and moment, and the like.

$$MGy = Ff + Fr \tag{1}$$

$$Iγd = LfFf - LrFr \tag{2}$$

$$Ff = -Kfβf \tag{3}$$

$$Fr = -Krβr \tag{4}$$

$$βf = β + (Lf/V)γ - δ \tag{5}$$

$$βr = β + (Lr/V)γ \tag{6}$$

Based on the above-described equations 1 to 6, the under-mentioned equation 7 is established.

$$\left(\frac{Lr}{Kf} - \frac{Lf}{Kr}\right)\frac{M}{L}Gy + \left(\frac{1}{Kf} + \frac{1}{Kr}\right)\frac{I}{L}γd = δ - \frac{L}{V}γ \tag{7}$$

Vehicle speed V is now assumed to be constant and Laplace operator is denoted by s. By Laplace transforming of the above-described equation 7 and rearranging it with respect to yaw rate γ, the under-mentioned equations 8 to 10 are established and by these equations a standard yaw rate γ(s) is derived.

$$γs = \frac{1}{1 + TpVs}\left(\frac{δ(s)}{L} - KhGy(s)\right)V \tag{8}$$

$$Kh = \frac{M}{L^2}\left(\frac{Lr}{Kf} - \frac{Lf}{Kr}\right) \tag{9}$$

$$Tp = \frac{I}{L^2}\left(\frac{1}{Kf} + \frac{1}{Kr}\right) \tag{10}$$

Kh in the above-described equation 9 is a stability factor and Tp in the above-described equation 10 is a coefficient multiplied to a vehicle speed V in a time constant of first order delay system having a time constant which is dependent on vehicle speed, that is, the coefficient referred to in this specification as "a time constant coefficient of steering response". These values are parameters which characterize a steering response in connection with yaw movement of a vehicle and represent a turning characteristic of a vehicle. The above-described equation 8 is an equation for calculating a yaw rate γ of a vehicle on the basis of actual steered angle of front wheel δ, vehicle speed V and lateral acceleration Gy. The yaw rate calculated from the linearized model is referred to as a transient yaw rate γtr. The transient yaw rate γtr has a first order delay relationship relative to a steady-state standard yaw rate γt represented by the under-mentioned equation 11.

$$\gamma t = \left(\frac{\delta}{L} - KhGy\right)V \tag{11}$$

Therefore, the above-mentioned configuration may be such that: a transient yaw rate γtr is calculated in accordance with the under-mentioned equation 11 corresponding to the above-described equation 8.

$$\gamma tr = \frac{1}{1 + TpVs}\gamma t \tag{12}$$

$$= \frac{1}{1 + TpVs}\left(\frac{\delta}{L} - KhGy\right)V$$

The deviation Δγt between a steady-state yaw rate γt and a detected yaw rate γ during steady-state turning of the vehicle is represented by the following equation 13, in which designed value and true value of stability factor are denoted by Khde and Khre, respectively.

$$\Delta\gamma t = \left(\frac{V\delta}{L} - KhdeGyV\right) - \gamma \tag{13}$$

$$= \left(\frac{V\delta}{L} - KhdeGyV\right) - \left(\frac{V\delta}{L} - KhreGyV\right)$$

$$= (Khre - Khde)GyV$$

By multiplying L/V on both sides of the above equation 13 to convert the yaw rate deviation Δγt into the steered angle deviation Δδt of the front wheels, the latter can be expressed by the following equation 14. The steered angle deviation Δδt of the front wheels is one of the indexes of the deviation between a steady-state yaw rate γt and a detected yaw rate γ and is not dependent on vehicle speed.

$$\Delta\delta t = (Khre - Khde)GyL \tag{14}$$

The steered angle deviation Δδt of the front wheels can be calculated as an index of the deviation between a steady-state yaw rate γt and a detected yaw rate γ in accordance with the above-mentioned equation 14.

It is apparent from the equation 14 that an estimated value Khp of stability factor can be calculated in accordance with the under-mentioned equation 15 by determining the relationship between a steady-state yaw rate γt and a detected yaw rate γ, that is, an inclination (Khre-Khde)L of the relationship between vehicle lateral acceleration Gy and steered angle deviation Δδt of the front wheels on an orthogonal coordinate system with a least-squares method or the like.

$$Khp = Khde + \text{inclination}/L \tag{15}$$

Assume that errors of zero point offset in the sensors in connection with yaw rate γ of the vehicle, lateral acceleration Gy of the vehicle, and steered angle of the front wheels are γ0, Gy0 and δ0, respectively. Then, detected values of yaw rate γ of the vehicle, lateral acceleration Gy of the vehicle, and steered angle of the front wheels are γ+γ0, Gy+Gy 0 and δ+δ0, respectively. Accordingly, the deviation Δγt between steady-state standard yaw rate γt and detected yaw rate γ when the vehicle is under steady-state turn condition can be expressed by the following equation 16.

$$\Delta\gamma t = \left(\frac{V(\delta + \delta 0)}{L} - Khde(Gy + Gy0)V\right) - (\gamma + \gamma 0) \tag{16}$$

$$= \left(\frac{V(\delta + \delta 0)}{L} - Khde(Gy + Gy0)V\right) - \left(\frac{V\delta}{L} - KhreGyV + \gamma 0\right)$$

$$= (Khre - Khde)GyV + \frac{V\delta 0}{L} - KhdeGy0L - \gamma 0$$

By multiplying L/V on both sides of the above equation 16 to convert the yaw rate deviation Δγt into the steered angle deviation Δδt of the front wheels, the latter can be expressed by the following equation 17. The relationship between lateral acceleration Gy of the vehicle and steered angle deviation Δδt of the front wheels represented by the following equation 17 is as shown in FIG. 19.

$$\Delta\delta t = (Khre - Khde)GyL + \delta 0 - KhdeGy0L - \frac{\gamma 0 L}{V} \tag{17}$$

While "δ0-KhdeGy0L" is constant, γ0L/V changes according to vehicle speed V. Accordingly, the intercept of the axis of ordinate shown in FIG. 19 varies according to vehicle speed V. Therefore, when an detection error due to zero point offset in a sensor is included in the detected value of yaw rate γ of the vehicle, the relationship of the steered angle deviation Δδt of the front wheels relative to lateral acceleration Gy varies according to vehicle speed V, which precludes to estimate stability factor accurately.

In order to estimate stability factor accurately, measures are required such as estimation of stability factor at each vehicle speed. Accordingly, huge data are required to estimate stability factor which burdens too much load on the turning characteristic estimation device and demands too long time in estimation of stability factor.

Vehicle lateral acceleration removed of the components having frequency equal to or lower than a first predetermined value is denoted by Gyft and yaw rate deviation index value removed of the components having frequency equal to or lower than a second predetermined value is denoted by Δδtft. If the first and the second predetermined values are set to values which are sufficiently higher than varying speed of γ0L/V according to the varying of vehicle speed V, Gyft does not include the error Gy0 and Δδtft does not include errors due to the errors γ0 and δ0. Accordingly, the following equation 18 corresponding to the above-mentioned equation 14 stands. The relationship between lateral acceleration Gyft and steered angle deviation Δδtft of the front wheels represented by the following equation 18 is as shown in FIG. 20. The line of the equation 18 passes the point of origin irrespective of vehicle speed V.

$$\Delta\delta tft = (Khre - Khde)GyftL \tag{18}$$

Therefore, an estimated value Khp of stability factor can be obtained without being affected by the error due to zero point offset in sensors by determining the relationship between lateral acceleration Gyft and steered angle deviation Δδtft of the front wheels, that is, an inclination (Khre-Khde)L of the relationship between vehicle lateral acceleration Gy and steered angle deviation Δδt of the front wheels on an orthogonal coordinate system, and calculating an estimated value Khp of stability factor in accordance with the above-described equation 15.

Therefore, the above-mentioned configuration may be such that: an estimated value Khp of stability factor is calculated in accordance with the above-described equation 15 in which the ratio of steered angle deviation Δδtft of the front wheels relative to lateral acceleration Gyft is denoted by inclination.

FIGS. 21 to 23 are graphs showing two time-series waves X, Y and a Lissajous curve of waves X, Y. In particular, FIG. 21 is a graph for the case where there is no phase difference between the two time-series waves X, Y; FIG. 22 is a graph for the case where the time-series wave Y lags the time-series wave X in phase; and FIG. 23 is a graph for the case where the time-series wave Y leads the time-series wave X in phase.

It is understood from FIGS. 21 to 23 that even when the integrated values X and Y have phase difference therebetween, utilizing the ratio of the integrated value Y relative to the integrated value X enables to obtain the ratio Y/X in which the influence of the phase difference is reduced.

Therefore, the above-mentioned configuration may be such that: an estimated value Khp of stability factor is calculated in accordance with the above-described equation 15 in which the ratio of the integrated value Δδtfa of steered angle deviation Δδtft of the front wheels relative to the integrated value Gyfta of lateral acceleration Gyft is denoted by inclination.

While in the above, steady-state turning of a vehicle is described, in transient turning of a vehicle, a first order delay filtering is conducted on steered angle deviation Δδtft of the front wheels and the integrated value Δδtfa thereof and a first order delay filtering is as well conducted on lateral acceleration Gyft and the integrated value Gyfta thereof. If the time constants in the first order delay filtering procedures are set to the same value, the inclination can be calculated on the basis of the first order delay filtered values as in a steady-state turning of a vehicle and the estimated value of stability factor can be calculated in accordance with the above-mentioned equation 15.

The above-mentioned configuration may be such that: the component equal to or lower than a first prescribed frequency is removed from a lateral acceleration by a high-pass filtering procedure and the component equal to or lower than a second prescribed frequency is removed from a yaw rate deviation index value by a high-pass filtering procedure.

The above-mentioned configuration may be such that: the first and second prescribed frequencies are same to each other.

The above-mentioned configuration may be such that: assuming vehicle speed is denoted by V and wheel base of a vehicle is denoted by L, the value in which a deviation between a transient yaw rate and an actual yaw rate is transferred to steered angle deviation of the front wheels is calculated by multiplying L/V to the magnitude of a deviation between a transient yaw rate and an actual yaw rate.

The above-mentioned configuration may be such that: the dead zone of the vehicle motion control is varied so that when the convergence degree of the estimated stability factor is high, the dead zone becomes narrow as compared with the case where the convergence degree is low.

BRIEF DESCRIPTION OF THE DRAWINGS

FIG. 21 is a graph showing two time-series waves X, Y and a Lissajous curve of waves X, Y for the case where there is no phase difference between the two time-series waves X, Y.

FIG. 22 is a graph showing two time-series waves X, Y and a Lissajous curve of waves X, Y for the case where the time-series wave Y lags the time-series wave X in phase.

FIG. 23 is a graph showing two time-series waves X, Y and a Lissajous curve of waves X, Y for the case where the time-series wave Y leads the time-series wave X in phase.

BEST MODE FOR CARRYING OUT THE INVENTION

The present invention will now be described in detail with respect to preferred embodiments by referring to the accompanying drawings.

First Embodiment

Figure 1:
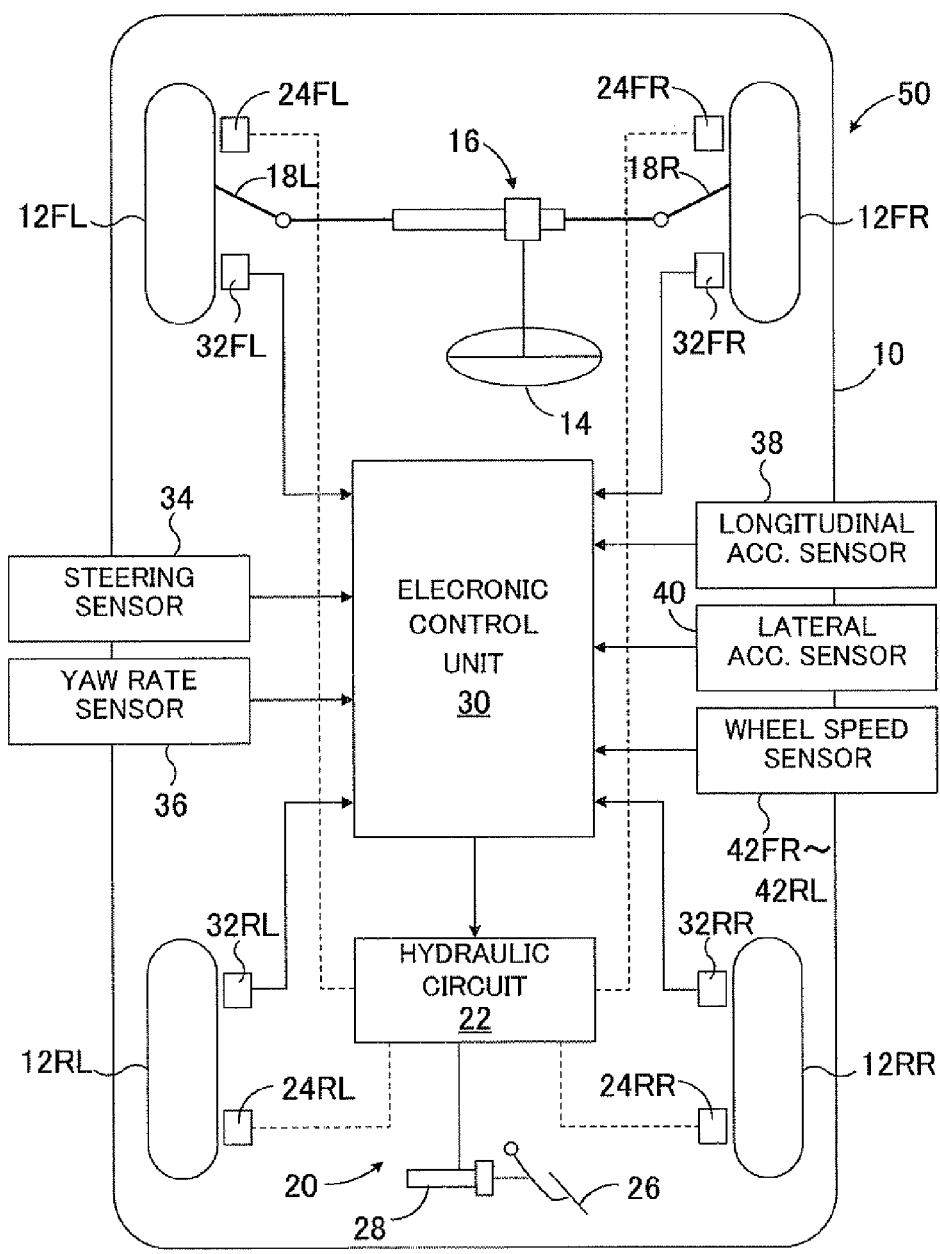
FIG. 1 is a schematic diagram showing a first embodiment of a turning characteristic assuming device according to the present invention, the device being applied to a vehicle motion control device.

FIG. 1 is a schematic diagram showing a first embodiment of a turning characteristic estimation device according to the present invention, the device being applied to a vehicle motion control device.

In FIG. 1, 50 denotes an entire vehicle motion control device for a vehicle 10. The turning characteristic estimation device according to the present invention is a part of the vehicle motion control device 50. The vehicle 10 has a right front wheel 12FR, a left front wheel 12FL, a right rear wheel 12RR, and a left rear wheel 12RL. The right and left front wheels 12FR, 12FL, which are steerable wheels, are steered by an unillustrated steering apparatus of a rack and pinion type via right and left tie rods 18R and 18L, respectively. The steering apparatus is driven in response to steering operation of a steering wheel 14 by a driver.

Braking forces of the left and right front wheels 12FL, 12FR and the left and right rear wheels 12RL, 12RR are controlled through control of respective braking pressures of corresponding wheel cylinders 24FL, 24FR, 24RL, 24RR by a hydraulic circuit 22 of a braking apparatus 20. The hydraulic circuit 22 includes a reservoir, an oil pump, and various valve units, etc., although they are not illustrated. Pressure in each wheel cylinder is usually controlled by pressure in a master cylinder 28 driven by driver's operation of depressing a brake pedal 26, and, as will be described below in detail, it is controlled as necessary by an electronic control unit 30.

The wheel cylinders of the wheels 12FR to 12RL is provided with pressure sensors 32FR to 32RL for detecting pressures Pi (i=fr, fl, rr, rl) in the respective wheel cylinders. A steering column to which the steering wheel 14 is coupled is provided with a steering sensor 34 for detecting a steering angle θ.

The vehicle 10 has a yaw rate sensor 36 for detecting an actual yaw rate γ of the vehicle, a longitudinal acceleration sensor 38 for detecting longitudinal acceleration Gx of the vehicle, a lateral acceleration sensor 40 for detecting a lateral acceleration Gy of the vehicle, and wheel speed sensors 42FR to 42RL for detecting wheel speeds Vwi (i=fr, fl, rr, rl) of the wheels. It is to be noted that the steering sensor 34, the yaw rate sensor 36 and the acceleration sensor 40 detect a steering angle, an actual yaw rate, and a lateral acceleration, respectively as positive values when the vehicle turns left.

As shown, the electronic control unit 30 are supplied with signals indicating pressures Pi detected by the pressure sensors 32FR-32RL, a signal indicating steering angle θ detected by the steering angle sensor 34, a signal indicating actual yaw rate γ detected by the yaw rate sensor 36, a signal indicating longitudinal acceleration Gx detected by the longitudinal acceleration sensor 38, a signal indicating lateral acceleration Gy detected by the lateral acceleration sensor 40, and signals indicating wheel speeds Vwi detected by the wheel speed sensors 42FR-42RL.

Although not shown in detail in the figure, the electronic control unit 30 includes a micro computer having a CPU, a ROM, a EEPROM, a RAM, a buffer memory and input/output ports and these components are connected with one another by bi-directional common bus. The ROM stores default values of stability factor Kh and time constant coefficient Tp of steering response which are utilized to calculate a standard yaw rate γt. These default values are set for each vehicle when it is shipped. The EEPROM stores an estimated value of stability factor Kh and the like. As explained in detail hereinafter, the estimated value of stability factor Kh and the like are renewed by calculating them on the basis of running data when the vehicle is in turning condition.

Figure 2:
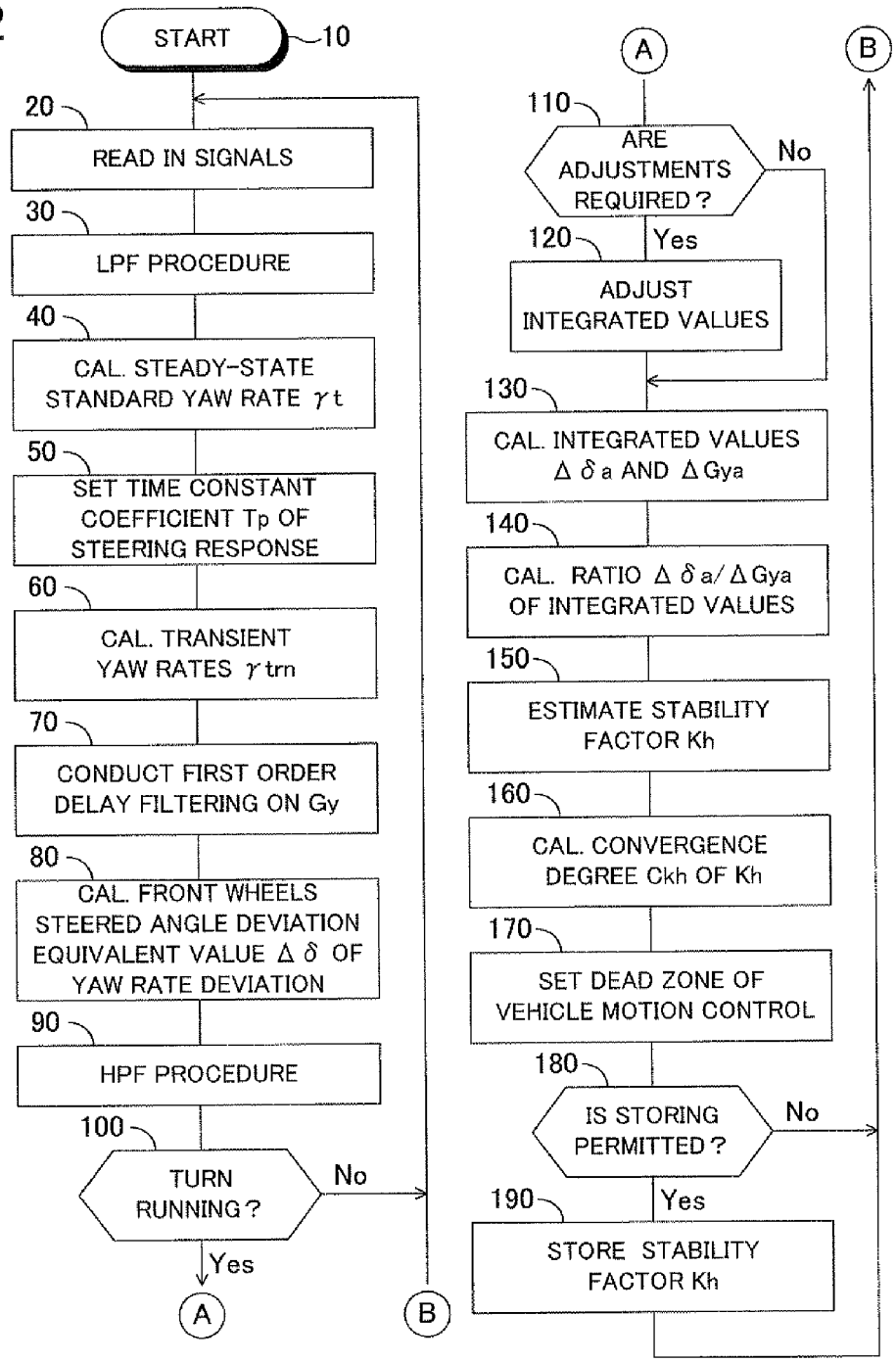
FIG. 2 is a flowchart showing a routine for calculating a stability factor Kh by estimation in the first embodiment.

After the vehicle starts to turn, the electronic control unit 30, by following a flow chart shown in FIG. 2 as described later, calculates a steady-state standard yaw rate γt on the basis of turn running data such as steering angle and calculates a first order delayed transient yaw rate γtr by conducting a first order delay filtering utilizing the time constant coefficient Tp of steering response on the steady-state standard yaw rate γt. The electronic control unit 30 calculates a front wheel steered angle deviation value Δδ equivalent to yaw rate deviation which is derived by transferring the difference between a transient yaw rate γtr and an actual yaw rate γ of the vehicle to a front wheel steered angle deviation.

The electronic control unit 30 calculates a first order delayed vehicle lateral acceleration Gyft by conducting a first order delay filtering utilizing the time constant coefficient Tp of steering response on the lateral acceleration Gy of the vehicle. The electronic control unit 30 calculates a band-pass filtered vehicle lateral acceleration Gyftbpf and a band-pass filtered front wheel steered angle deviation value Δδbpf equivalent to yaw rate deviation.

The electronic control unit 30 calculates an integrated value Δδa of front wheel steered angle deviation value Δδbpf equivalent to yaw rate deviation and an integrated value ΔGya of vehicle lateral acceleration Gyftbpf, and calculates an integrated value ratio Δδa/ΔGya. The electronic control unit 30 calculates the sum of an initial value of stability factor Kh which is utilized in calculation of a steady-state standard yaw rate γt and an adjusting value based on the integrated value ratio Δδa/ΔGya as an estimated value of stability factor Kh. When a predetermined condition is satisfied, the electronic control unit 30 stores the estimated value of stability factor Kh in the EEPROM.

The electronic control unit 30 calculates a target yaw rate γtt corresponding to a transient yaw rate γtr using an estimated value of stability factor Kh stored in the EEPROM and calculates a yaw rate deviation Δγ which is a difference between a detected yaw rate γ and the target yaw rate γtt. The electronic control unit 30 decides whether or not vehicle turning behavior is aggravated by judging whether or not the magnitude of the yaw rate deviation Δγ exceeds a reference value γo (a positive constant). If the vehicle turning behavior is aggravated, the electronic control unit 30 controls the vehicle motion to stabilize vehicle turning behavior. In this connection, it is to be noted that the vehicle motion control conducted by the electronic control unit 30 may be any control so long as it controls vehicle motion on the basis of the target yaw rate γtt which is calculated using an estimated value of stability factor Kh.

Furthermore, the electronic control unit 30 calculates a convergence degree Ckh of the estimated value of stability factor Kh. The electronic control unit 30 variably sets a dead zone of the vehicle motion control by variably setting the reference value γo Next, a calculation routine for estimating a stability factor Kh in the first embodiment will be described with reference to the flowchart shown in FIG. 2. Control according to the flowchart shown in FIG. 2 is started when an unillustrated ignition switch is turned on, and is repeatedly executed at predetermined time intervals. The same goes in the embodiments described hereinafter.

First, the control is started in step 10, and in step 10, a stability factor Kh is initialized by setting the latest value renewed in step 190 in former vehicle running period to an initial value Kh0 of stability factor Kh. It is to be noted that if there is no stored value of stability factor Kh in the FEEPROM, a default value which was set in advance when the vehicle was shipped is set to an initial value Kh0 of stability factor Kh.

In step 20, signals representing steering angle θ, etc. detected by the associated sensors are read. In step 30, a low-pass filtering procedure is conducted on each signal indicating steering angle θ, etc. to remove high frequency noise. In this connection, the low-pass filtering procedure may be, for example, a first order low-pass filtering having a cut-off frequency of 3.4 Hz.

In step 40, vehicle speed V is calculated on the basis of wheel speeds Vwi; a steered angle δ of the front wheels is calculated on the basis of steering angle θ; and a steady-state standard yaw rate γt is calculated in accordance with the above-mentioned equation 11.

In step 50, a time constant coefficient Tp of steering response is set to its default value which was set in advance when the vehicle was shipped. It is to be noted that in the case where a time constant coefficient Tp of steering response is estimated on the basis of vehicle running data, a time constant coefficient Tp of steering response may be set to an estimated value.

In step 60, a first order delay filtering utilizing the time constant coefficient Tp of steering response is conducted in accordance with the above-mentioned equation 12 to calculate a transient yaw rate γtr based on the steady-state standard yaw rate γt calculated in step 40.

In step 70, a first order delay filtering utilizing the time constant coefficient Tp of steering response is conducted on the vehicle lateral acceleration Gy in accordance with the under-mentioned equation 19 to calculate a first order delay filtered vehicle lateral acceleration Gyft.

$$Gyft = \frac{1}{1+TpVs}Gy \quad (19)$$

In step 80, an equivalent value Δδ converted to steered angle deviation of the front wheels is calculated in accordance with the under-mentioned equation 20, the value being derived by converting the deviation between the transient yaw rate γtr and the actual yaw rate γ to the steered angle deviation of the front wheels.

$$\Delta\delta = (\gamma tr - \gamma)\frac{L}{V} \quad (20)$$

In step 90, high-pass filtering procedures are conducted on the first order delay filtered vehicle lateral acceleration Gyft which was calculated in step 70 and the equivalent value Δδ converted to steered angle deviation of the front wheels which was calculated in step 80 to remove influences due to zero point offset in the sensors. In this connection, the high-pass filtering procedure may be, for example, a first-order high-pass filtering having a cut-off frequency of 0.2 Hz.

Since the low-pass filtering procedure is conducted in step 30 as described above, the above-mentioned high-pass filtering procedure generates the results obtained by conducting a band-pass filtering procedure on the first order delay filtered vehicle lateral acceleration Gyft and the yaw rate deviation equivalent value Δδ converted to steered angle deviation of the front wheels. Therefore, the vehicle lateral acceleration Gyft and the yaw rate deviation equivalent value Δδ converted to steered angle deviation of the front wheels which were high-pass filtered in step 90 are referred to a band-pass filtered vehicle lateral acceleration Gyftbpf and a band-pass filtered yaw rate deviation equivalent value Δδbpf converted to steered angle deviation of the front wheels.

In step 100, a decision is made as to whether or not the vehicle is under a turn running condition. If a negative decision is made, the control returns to step 20. If a positive decision is made, the control proceeds to step 110. In this connection, the decision as to whether or not the vehicle is under a turn running condition may be made by deciding whether or not the absolute value of lateral acceleration Gy of the vehicle is equal to or larger than a reference value, deciding whether or not the absolute value of actual yaw rate γ of the vehicle is equal to or larger than a reference value, or deciding whether or not the absolute value of the product of actual yaw rate γ of the vehicle and vehicle speed V is equal to or larger than a reference value, under the situation where the vehicle runs at a vehicle speed not lower than a reference value.

In step 110, a decision is made as to whether or not adjustments are to be executed on the present integrated values Δδa of the band-pass filtered yaw rate deviation equivalent value Δδbpf converted to steered angle deviation of the front wheels and the present integrated values ΔGya of the band-pass filtered vehicle lateral acceleration Gyftbpf calculated in step 130 in previous cycle. If a negative decision is made, the control proceeds to step 130, while a positive decision is made, the control proceeds to step 120.

It is to be understood that a decision may be made that adjustments are to be executed on the integrated values Δδa and ΔGya when either of the under-mentioned (A1) and (A2) is satisfied. The condition (A2) is decided whether or not it is satisfied when a time constant coefficient Tp of steering response is estimated and a time constant coefficient Tp of steering response is se to the estimated value in step 50.

(A1) The absolute value of the difference ΔKh between the stability factor Kh when the integrated values Δδa and ΔGya were recently adjusted and the present stability factor Kh which was estimated in step 150 in previous cycle is higher than a reference value for the deviation of the stability factor.

(A2) The absolute value of the difference ΔTp between the time constant coefficient Tp of steering response when the integrated values Δδa and ΔGya were recently adjusted and the time constant coefficient Tp of steering response which was set in step 150 in the present cycle is higher than a reference value for the deviation of time constant coefficient of steering response.

In step 120, an adjust gain Gaj is calculated in accordance with the under-mentioned equation 21, in which a lower limit value previously set for the integrated value Δδa of the band-pass filtered yaw rate deviation equivalent value Δδbpf is denoted by Δδamin (positive constant) and a lower limit value previously set for the integrated value ΔGya of the band-pass filtered vehicle lateral acceleration Gyftbpf is denoted by ΔGymin (positive constant). It is to be noted that in the under-mentioned equation 21, MIN represents that a minimum value in the values in the bracket is selected and Max represents that a maximum value in the values in the bracket is selected. The same goes to the other similar equations.

$$Gaj = \text{MIN}\left(\text{MAX}\left(\frac{\Delta\delta amin}{|\text{present}\Delta\delta a|}, \frac{\Delta Gyamin}{|\text{present}\Delta Gya|}\right), 1\right) \quad (21)$$

In addition, in step 120, an adjusted integrated value Δδa of yaw rate deviation equivalent value Δδbpf and an adjusted integrated value ΔGya of vehicle lateral acceleration Gyftbpf are calculated in accordance with the under-mentioned equations 22 and 23, respectively.

$$\Delta\delta a = \text{present } \Delta\delta a \times Gaj \quad (22)$$

$$\Delta Gya = \text{present } \Delta Gya \times Gaj \quad (23)$$

In step 130, when the vehicle lateral acceleration Gyftbpf is positive, an integrated value Δδa of the front wheel steered angle deviation value Δδbpf equivalent to yaw rate deviation and an integrated value ΔGya of the vehicle lateral acceleration Gyftbpf are calculated in accordance with the under-mentioned equations 24 and 25, respectively.

$$\Delta\delta a = \text{present } \Delta\delta a + \Delta\delta bpf \quad (24)$$

$$\Delta Gya = \text{present } \Delta Gya + Gyftbpf \quad (25)$$

When the vehicle lateral acceleration Gyftbpf is not positive, an integrated value Δδa of the yaw rate deviation equivalent value Δδbpf and an integrated value ΔGya of the vehicle lateral acceleration Gyftbpf are calculated in accordance with the under-mentioned equations 26 and 27, respectively.

$$\Delta\delta a = \text{present } \Delta\delta a - \Delta\delta bpf \quad (26)$$

$$\Delta Gya = \text{present } \Delta Gya \times Gyftbpf \quad (27)$$

In step 140, the integrated value Δδa of the yaw rate deviation equivalent value Δδbpf is divided by the integrated value ΔGya of the vehicle lateral acceleration Gyftbpf to calculate a ratio Δδa/ΔGya of the integrated values.

In step 150, an estimated value of stability factor Kh is calculated in accordance with the under-mentioned equation 28 in which the designed value Khde in the above-mentioned equation 15 is set to the initial value Kh0.

$$Kh = Kh0 + (\Delta\delta a/\Delta Gya)/L \quad (28)$$

In step 160, a first order low-pass filter procedure is conducted on the estimated value of stability factor Kh in accordance with the under-mentioned equation 29 having a cut-off frequency Tc set to 0.05 Hz, for example, to calculate a low-pass filtered estimated value Khlpf of stability factor Kh.

$$Khlpf = \frac{1}{1 + sTc} Kh \quad (29)$$

In step 160, a first order low-pass filter procedure is conducted on the absolute value of the difference between the estimated value of stability factor Kh and the low-pass filtered estimated value Khlpf of stability factor Kh in accordance with the under-mentioned equation 30 to calculate a deviation ΔKhlpf of the low-pass filtered estimated value of stability factor Kh. Further, an inverse number 1/ΔKhlpf of the deviation ΔKhlpf is calculated as a convergence degree Ckh of the estimated value of stability factor Kh.

$$\Delta Khlpf = \frac{1}{1 + sTc}(|Kh - Khlpf|) \quad (30)$$

Figure 3:
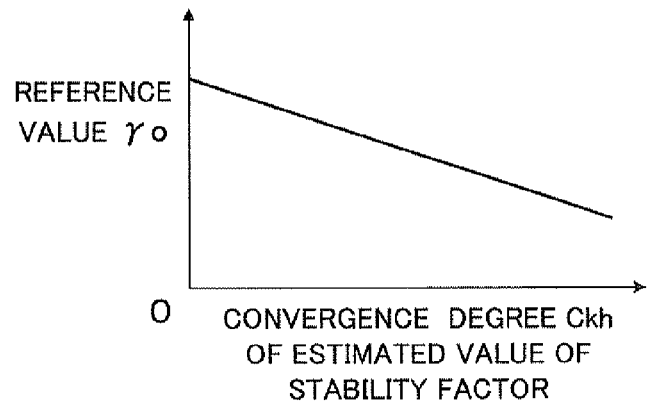
FIG. 3 is a graph showing a relationship between a convergence degree Ckh of an estimated value of stability factor Kh and a reference value γo.

In step 170, the reference value γo for vehicle motion control conducted based on the deviation between a detected yaw rate γ and a target yaw rate γtt is calculated according to the map corresponding to FIG. 3 on the basis of the convergence degree Ckh of the estimated value of stability factor Kh, whereby a dead zone of vehicle motion control is variably set.

In step 180, a decision is made as to whether or not the estimated value of stability factor Kh is permitted to be stored in the EEPROM by deciding whether or not the convergence degree Ckh of the estimated value of stability factor Kh is larger than a reference value (a positive value). If a negative decision is made, the control returns to step 20. If a positive decision is made, in step 190, the estimated value of stability factor Kh is stored in the EEPROM so as to renew the estimated value of stability factor Kh stored in the EEPROM.

In the operation of the first embodiment having the configuration as described above, in step 40, a steady-state standard yaw rate γt is calculated and in step 60, a transient yaw rate γtr is calculated on the basis of the steady-state standard yaw rate γt. In step 70, a first order delay filtered vehicle lateral acceleration Gyft is calculated and in step 80, an equivalent value Δδ converted to steered angle deviation of the front wheels is calculated, the value being derived by converting the deviation between the transient yaw rate γtr and the actual yaw rate γ to the steered angle deviation of the front wheels.

In step 90, high-pass filtering procedures are conducted on the first order delay filtered vehicle lateral acceleration Gyft and the front wheel steered angle deviation value Δδ equivalent to yaw rate deviation to calculate a band-pass filtered vehicle lateral acceleration Gyftbpf and a front wheel steered angle deviation value Δδbpf equivalent to band-pass filtered yaw rate deviation which is derived by transferring the magnitude of the difference between a band-pass filtered actual yaw rate γbpf and a band-pass filtered transient yaw rate γtrbpf to a front wheel steered angle deviation.

In step 130, an integrated value Δδa of the front wheel steered angle deviation value Δδbpf equivalent to band-pass filtered yaw rate deviation and an integrated value ΔGya of the vehicle lateral acceleration Gyftbpf are calculated. In step 140, a ratio of the integrated values Δδa/ΔGya is calculated by dividing the integrated value Δδa of the yaw rate deviation equivalent value Δδbpf by the integrated value ΔGya of the vehicle lateral acceleration Gyftbpf.

Further, in step 150, an estimated value of stability factor Kh is calculated as a sum of the initial value Kh0 of stability factor Kh and an adjusting value based on the ratio of the integrated values Δδa/ΔGya.

Thus, according to the first embodiment, an estimated value of stability factor Kh can be calculated as a value which is derived by adjusting the initial value of stability factor utilized in calculation of the steady-state standard yaw rate γt of the vehicle on the basis of the relationship between the yaw rate deviation and the vehicle lateral acceleration so that a transient yaw rate γtr of the vehicle approaches a real yaw rate. Accordingly, an estimated value of stability factor can be adjusted so that the estimated value of stability factor approaches a real yaw rate, which enables to derive an estimated value of stability factor which is close to a real stability factor.

According to the first embodiment, in particular, a steady-state standard yaw rate γt is calculated on the basis of steering angle θ, etc. which are low-pass filtered in step 30. In step 90, high-pass filtering procedures are conducted on the vehicle lateral acceleration Gyft and the front wheel steered angle deviation value Δδ equivalent to yaw rate deviation to calculate a band-pass filtered vehicle lateral acceleration Gyftbpf and a front wheel steered angle deviation value Δδbpf equivalent to band-pass filtered yaw rate deviation. Further, in step 130, an integrated value Δδa of the front wheel steered angle deviation value Δδbpf equivalent to yaw rate deviation and an integrated value ΔGya of the vehicle lateral acceleration Gyftbpf are calculated, and in step 140, a ratio of the integrated values Δδa/ΔGya is calculated.

Therefore, it is possible to remove high frequency noise included in signals indicating detected steering angle θ, etc. and as well to remove influences due to zero point offset in the sensors. Since the vehicle lateral acceleration Gyftbpf and the front wheel steered angle deviation value Δδbpf equivalent to yaw rate deviation can be calculated without the influences due to zero point offset in the sensors, a stability factor Kh can more accurately be estimated as compared with a case where no high-pass filtering procedure is conducted. The number of high-pass filtering procedures can be reduced so that calculation load on the electronic control unit 30 can be alleviated as compared with a case where high-pass filtering procedures are conducted on steering angle θ and lateral acceleration Gy which are used to calculate a steady-state standard yaw rate γt.

It is to be understood that band-pass filtering procedures may be conducted on a vehicle lateral acceleration Gy and a front wheel steered angle deviation value Δδ equivalent to yaw rate deviation without conducting low-pass filtering procedures on steering angle θ, etc. In that case, the number of calculations required for filtering procedures can be reduced as compared with the above-mentioned first embodiment while accurately estimating a stability factor Kh and effectively removing high frequency noise so that calculation load on the electronic control unit 30 can further be alleviated.

Further, according to the first embodiment, a ratio of the integrated values Δδa/ΔGya is calculated which is utilized to calculate an adjusting value for adjusting the initial value Kh0 of stability factor Kh which is utilized in calculation of a steady-state standard yaw rate γt on the basis of an integrated value ΔGya of a band-pass filtered vehicle lateral acceleration Gyftbpf and an integrated value Δδa of a band-pass filtered front wheel steered angle deviation value Δδbpf equivalent to yaw rate deviation.

Therefore, it is possible to reduce the risk that stability factor Kh is inaccurately calculated due to instant fluctuations in a vehicle lateral acceleration Gyftbpf and a front wheel steered angle deviation value Δδbpf equivalent to yaw rate deviation as compared with the case where a ratio Δδa/ΔGya which is utilized to calculate an adjusting value is calculated on the basis of a band-pass filtered vehicle lateral acceleration Gyftbpf and a band-pass filtered front wheel steered angle deviation value Δδbpf.

Further, according to the first embodiment, integrated value ΔGya is calculated as the integrated value of front wheel steered angle deviation value Δδ equivalent to yaw rate deviation in which the deviation between a transient yaw rate γtr and an actual yaw rate γ is transferred to the steered angle deviation of the front wheels. Accordingly, stability factor Kh can be estimated without being influenced by vehicle speed V.

Therefore, stability factor Kh can accurately be estimated as compared with the case where an integrated value of index values of yaw rate deviation is, for example, an integrated value of the deviation between a transient yaw rate γtr and an actual yaw rate γ. It is also possible to avoid cumbersome procedures to estimate stability factor Kh for each vehicle speed V or to change stability factor Kh used to calculate a target yaw rate γtt for each vehicle speed V to thereby reduce the number of required calculations and the capacity of storing device.

Further, according to the first embodiment, in step 110, a decision is made as to whether or not adjustments are to be executed on the integrated values Δδa of the band-pass filtered yaw rate deviation equivalent value Δδbpf converted to steered angle deviation of the front wheels and the present integrated values ΔGya of the band-pass filtered vehicle lateral acceleration Gyftbpf. If a positive decision is made, an adjust gain Gaj which is not larger than 1 is calculated in step 120. In step 130, an integrated value Δδa of the front wheel steered angle deviation value Δδbpf equivalent to yaw rate deviation and an integrated value ΔGya of the vehicle lateral acceleration Gyftbpf are calculated as integrated values which are adjusted with the adjust gain Gaj.

Therefore, it is possible to prevent the previous integrated value Δδa of the front wheel steered angle deviation value Δδbpf equivalent to yaw rate deviation and the previous integrated value ΔGya of the vehicle lateral acceleration Gyftbpf from adversely influencing the estimation of stability factor Kh under such a situation where the deviation ΔKh between the stability factor Kh at a time when the previous integrated values Δδa and ΔGya were adjusted and the present stability factor Kh which was estimated in step 150 in previous cycle becomes large in magnitude for the reason, for example, that loading condition of the vehicle changes significantly.

Further, according to the first embodiment, in step 120, an adjust gain Gaj is calculated in accordance with the under-mentioned equation 21 on the basis of the integrated values Δδa of the yaw rate deviation equivalent value Δδbpf converted to steered angle deviation of the front wheels and the integrated values ΔGya of the vehicle lateral acceleration Gyftbpf. Accordingly, an adjust gain Gaj can be variably set in accordance with the magnitude of the integrated values Δδa of the yaw rate deviation equivalent value Δδbpf converted to steered angle deviation of the front wheels and the magnitude of the integrated values ΔGya of the vehicle lateral acceleration Gyftbpf. Therefore, as compared with the case where the adjust gain Gaj is constant, the risk can be reduced that an error in estimating stability factor Kh becomes large for the reason that the adjust gain Gaj is too large, while on the other hand, the risk can as well be reduced that S/N ratio in estimating stability factor Kh decreases for the reason that the adjust gain Gaj is too small.

Further, according to the first embodiment, in step 180, a decision is made as to whether or not the estimated value of stability factor Kh is permitted to be stored and if a positive decision is made, in step 190, the estimated value of stability factor Kh is stored in the EEPROM. Therefore, the estimated value of stability factor Kh can be stored in the EEPROM at a stage when the estimated value of stability factor Kh substantially conforms to an actual stability factor. That is, it is possible to repeat to estimate stability factor Kh until the estimated value of stability factor Kh substantially conforms to an actual stability factor to thereby gradually make the estimated value of stability factor Kh be closer to an actual stability factor.

Further, according to the first embodiment, in step 100, a decision is made as to whether or not the vehicle is under the turn running condition and if a positive decision is made, the control procedures of step 110 and the following steps are executed. Therefore, it is possible to prevent step 110 and the following steps from being unnecessarily conducted and stability factor Kh from being inaccurately estimated under a situation where the vehicle is not turning and accordingly accurate estimation of t stability factor Kh is impossible.

Further, according to the first embodiment, in step 160, a deviation ΔKhlpf of the low-pass filtered estimated value of stability factor Kh is calculated and an inverse number1/ΔKhlpf of the deviation ΔKhlpf is calculated as a convergence degree Ckh of the estimated value of stability factor Kh. In addition, in step 170, the reference value γo for vehicle motion control conducted based on the yaw rate deviation Δγ so that as the convergence degree Ckh increases, the reference value γo decreases, whereby a dead zone of vehicle motion control is variably set.

Therefore, when the convergence degree Ckh is low and the accuracy in estimating stability factor Kh is accordingly low, the reference value γo can be enlarged to extend the dead zone of the vehicle motion control and the inaccurate vehicle motion control can be prevented from being conducted with a control amount based on inaccurate estimated value of stability factor Kh. In contrast, when the convergence degree Ckh is high and the accuracy in estimating stability factor Kh is accordingly high, the reference value γo can be reduced to narrow the dead zone of the vehicle motion control and the accurate vehicle motion control can be conducted with a control amount based on accurate estimated value of stability factor Kh.

Second Embodiment

Figure 4:
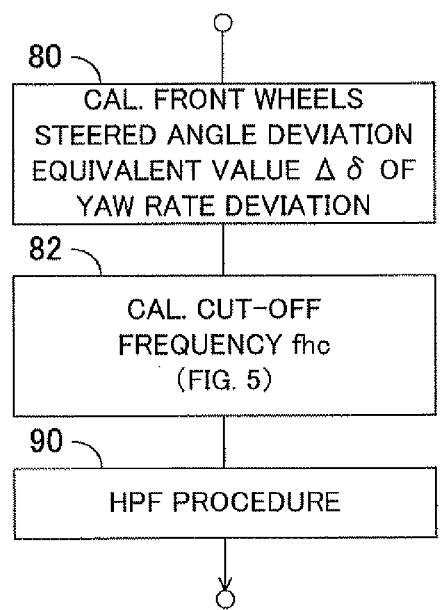
FIG. 4 is a flowchart showing a main portion of a routine for calculating a stability factor Kh by estimation in a second embodiment of the turning characteristic estimation device according to the present invention which is configured as a modification of the first embodiment.

FIG. 4 is a flowchart showing a main portion of a routine for calculating a stability factor Kh by estimation in a second embodiment of the turning characteristic estimation device according to the present invention which is configured as a modification of the first embodiment. In FIG. 4, steps identical to those shown in FIG. 2 are denoted by the same step numbers. The same goes in the flowcharts for the embodiments described hereinafter.

In this second embodiment, after completion of step 80, the number of reciprocating steering operations by a driver per unit time is calculated as steering frequency fs in step 82. A cutoff frequency fhc of a high-pass filtering procedure in step 90 is also calculated on the basis of the steering frequency fs from a map corresponding to the graph shown in FIG. 5 so that as the steering frequency fs decreases, the cutoff frequency fhc lowers.

In the high-pass filtering procedure on the vehicle lateral acceleration Gyft and the front wheel steered angle deviation value Δδ equivalent to yaw rate deviation in step 90, cutoff frequency is set to the cutoff frequency fhc calculated in step 82.

In the above-described first embodiment, the cutoff frequency fhc of a high-pass filtering procedure in step 90 is constant. Accordingly, if the cutoff frequency fhc is set so high that the influence of zero point offset in the sensors may surely be removed, there arises a risk that stability factor Kh can not be estimated under a situation where the number of reciprocating steering operations by a driver per unit time is small. In contrast, if the cutoff frequency fhc is set so low, there arises a risk that the adverse influence of zero point offset in the sensors can not be removed under a situation where the number of reciprocating steering operations by a driver per unit time is large.

According to the second embodiment, the cutoff frequency fhc is variably set in accordance with steering frequency fs so that as the steering frequency fs is lower, the cutoff frequency fhc lowers. Therefore, estimation of stability factor Kh can be prevented from being defied under a situation where the number of reciprocating steering operations by a driver per unit time is small while effectively removing the influence of zero point offset in the sensors under a situation where the number of reciprocating steering operations by a driver per unit time is large.

It is to be noted that although the cutoff frequency fhc is calculated on the basis of the steering frequency fs from the map, it may be calculated by a function of the steering frequency fs.

Third Embodiment

Figure 5:
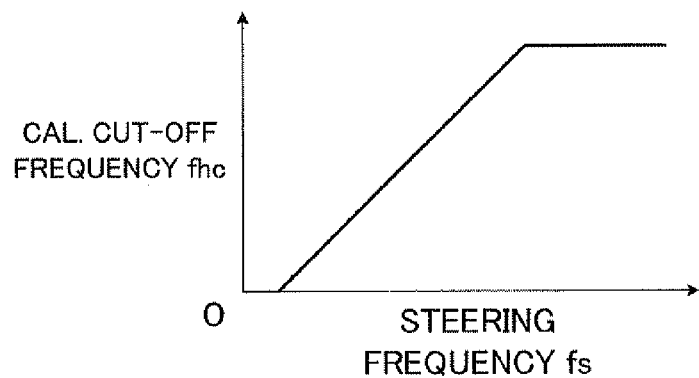
FIG. 5 is a graph showing a relationship between steering frequency fs and a cutoff frequency fhc of a high-pass filtering procedure.
Figure 6:
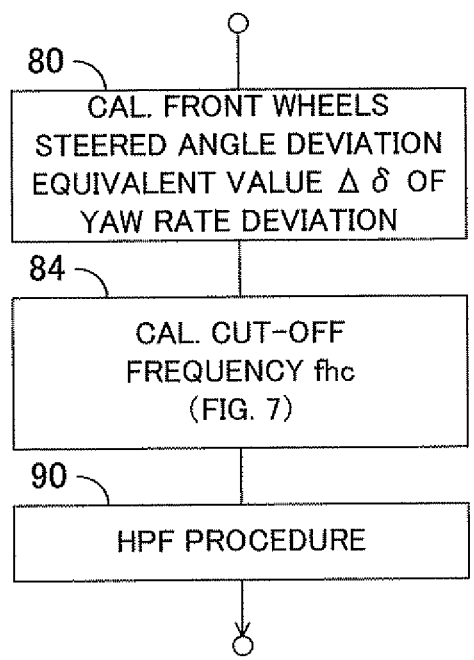
FIG. 6 is a flowchart showing a main portion of a routine for calculating a stability factor Kh by estimation in a third embodiment of the turning characteristic estimation device according to the present invention which is configured as a modification of the first embodiment.

FIG. 5 is a flowchart showing a main portion of a routine for calculating a stability factor Kh by estimation in a third embodiment of the turning characteristic estimation device according to the present invention which is configured as a modification of the first embodiment.

Figure 7:
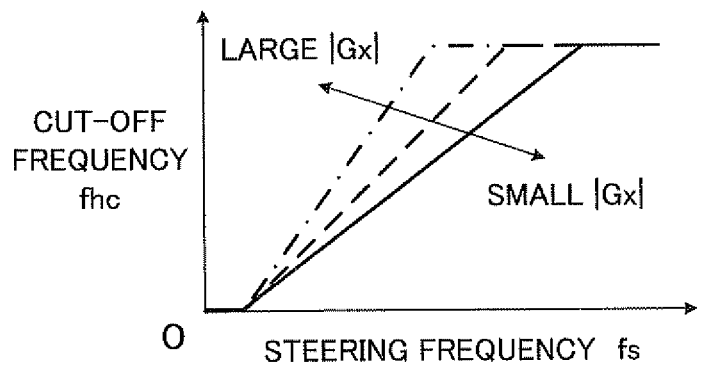
FIG. 7 is a graph showing a relationship among steering frequency fs, a cutoff frequency fhc of a high-pass filtering procedure and an absolute value of longitudinal acceleration Gx of the vehicle.

In this third embodiment, after completion of step 80, the number of reciprocating steering operations by a driver per unit time is calculated as steering frequency fs in step 84. A cutoff frequency fhc of a high-pass filtering procedure is also calculated on the basis of the steering frequency fs and longitudinal acceleration Gx of the vehicle from a map corresponding to the graph shown in FIG. 7 so that as the steering frequency fs decreases, the cutoff frequency fhc lowers and as the absolute value of longitudinal acceleration Gx of the vehicle increases, the cutoff frequency fhc also increases.

In the high-pass filtering procedure on the vehicle lateral acceleration Gyft and the front wheel steered angle deviation value Δδ equivalent to yaw rate deviation in step 90, cutoff frequency is set to the cutoff frequency fhc calculated in step 84.

Assume that an error of zero point offset in the steering sensor 34 in connection with steered angle of the front wheels is δ0, and an error of zero point offset in the lateral acceleration sensor 40 in connection with lateral acceleration Gy of the vehicle is Gy0. In addition, assume that an error of zero point offset in the yaw rate sensor 36 in connection with yaw rate γ of the vehicle is γ0. Considering these errors, the front wheel steered angle deviation value Δδ equivalent to yaw rate deviation is represented by the above-mentioned equation 17.

Accordingly, the influence of zero point offset in the sensors is the second to the fourth terms in by the above-mentioned equation 17, that is, "δ0−KhdeGy0L−γ0L/V". Therefore, as the change in vehicle speed V is larger, that is, as the magnitude of longitudinal acceleration Gx of the vehicle is larger, the influence of zero point offset in the sensors against the change of steady-state standard yaw rate γt increases and, to the contrary, as the magnitude of longitudinal acceleration Gx of the vehicle is lower, the influence of zero point offset in the sensors against the change of steady-state standard yaw rate γt decreases.

According to the third embodiment, the cutoff frequency fhc is variably set as well in accordance with longitudinal acceleration Gx of the vehicle so that as the absolute value of longitudinal acceleration Gx of the vehicle is higher, the cutoff frequency fhc of a high-pass filtering procedure increases. Therefore, it is possible not only to achieve the same operation and effect as in the second embodiment, but also to effectively remove the influence of zero point offset in the sensors regardless of the change in vehicle speed V.

It is to be noted that although the cutoff frequency fhc is calculated on the basis of the steering frequency fs and the absolute value of longitudinal acceleration Gx of the vehicle from the map, it may be calculated by a function of the steering frequency fs and the absolute value of longitudinal acceleration Gx of the vehicle.

Fourth Embodiment

Figure 8:
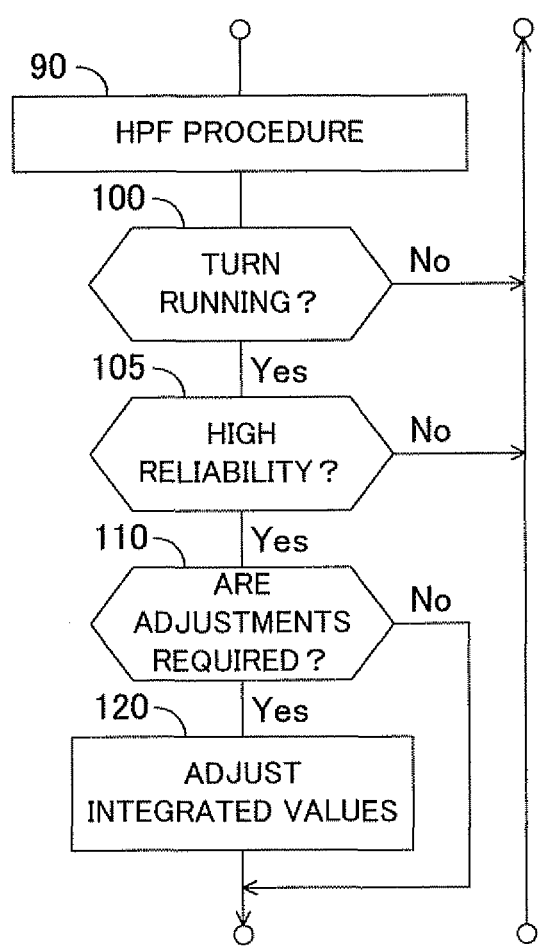
FIG. 8 is a flowchart showing a main portion of a routine for calculating a stability factor Kh by estimation in a fourth embodiment of the turning characteristic estimation device according to the present invention which is configured as a modification of the first embodiment.

FIG. 8 is a flowchart showing a main portion of a routine for calculating a stability factor Kh by estimation in a fourth embodiment of the turning characteristic estimation device according to the present invention which is configured as a modification of the first embodiment.

In this fourth embodiment, if it is decided that the vehicle is under turn condition in step 100, step 105 is conducted prior to step 110. In step 105, a decision is made as to whether or not the vehicle is under the condition that allows to estimate a stability factor Kh with high reliability. If a negative decision is made, the control returns to step 20. If a positive decision is made, the control proceeds to step 110.

It is to be understood that a decision may be made that the vehicle is under the condition that allows to estimate a stability factor Kh with high reliability when all of the under-mentioned (B1) and (B2) are satisfied.

(B1) The road is not rough.
(B2) The vehicle is not under braking.

It is to be understood that the condition B1 is based on the consideration that at a rough road, actual yaw rate γ includes noise and tire grip to road surface may fluctuate. The condition B2 is based on the consideration that in the calculation of steady-state standard yaw rate γt according to the above-mentioned equation 11, no influence of braking force is presupposed.

According to the fourth embodiment, therefore, stability factor Kh can more accurately be estimated as compared with the first to third embodiments in which a decision is not conducted as to whether or not the vehicle is under the condition that allows estimation of a stability factor Kh with high reliability.

Fifth Embodiment

Figure 9:
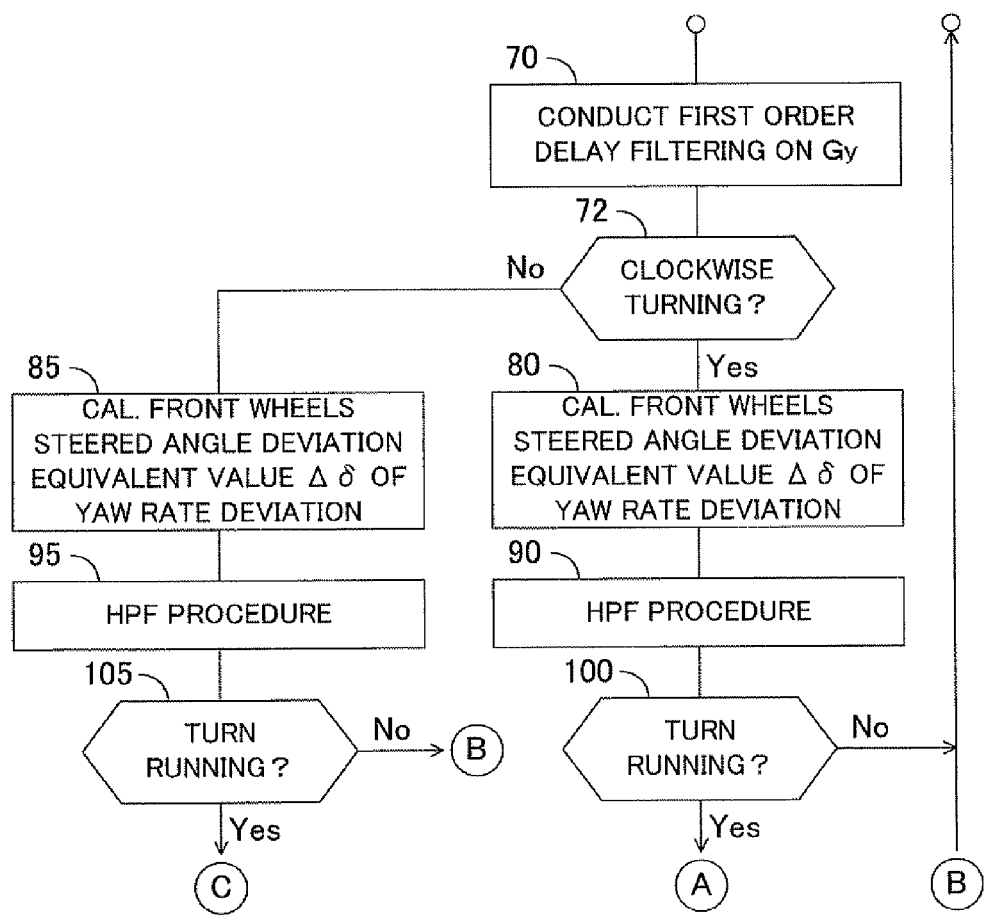
FIG. 9 is a flowchart showing former half portion of a routine for calculating a stability factor Kh by estimation in a fifth embodiment of the turning characteristic estimation device according to the present invention which is configured as a modification of the first embodiment.
Figure 10:
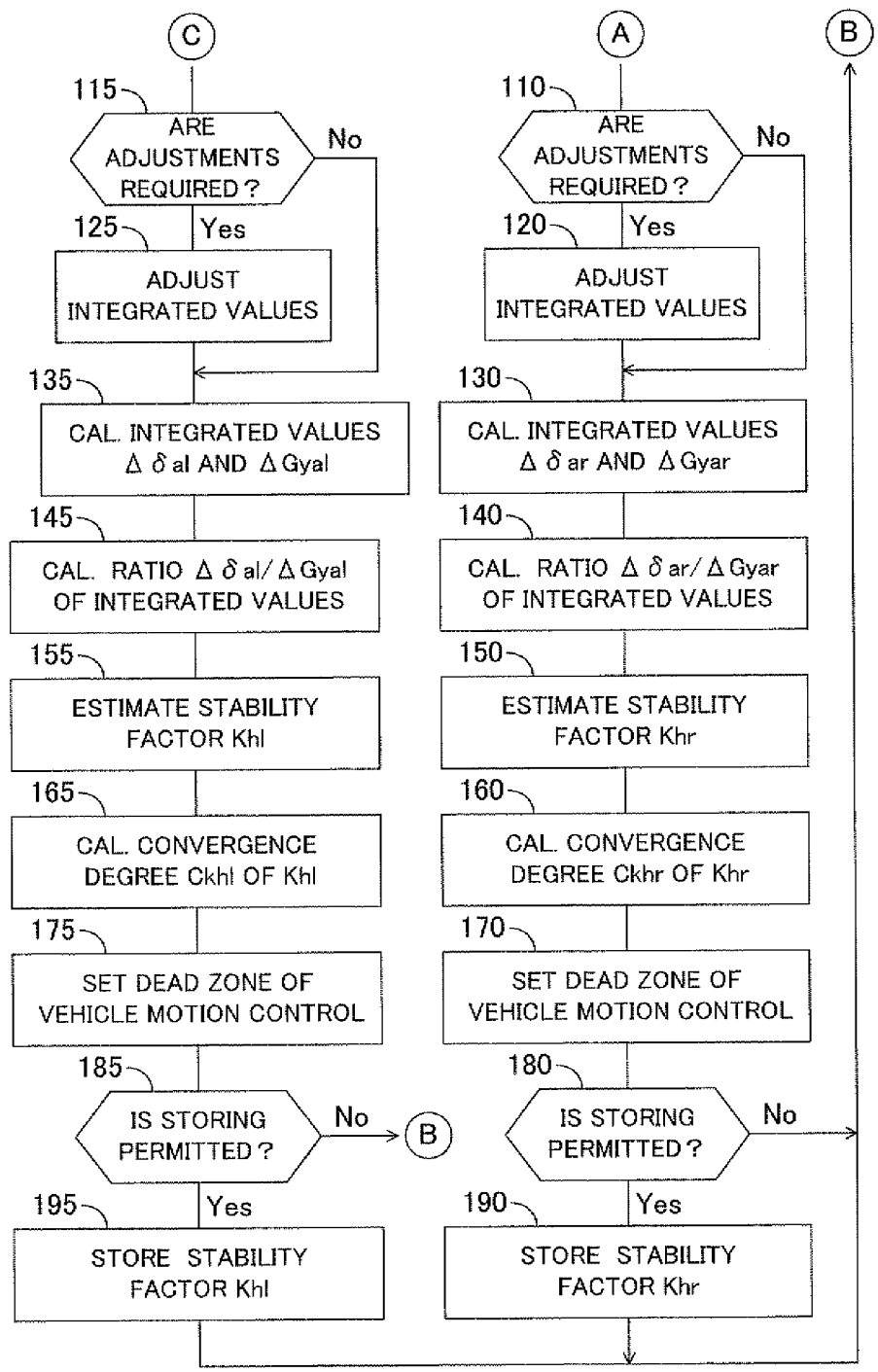
FIG. 10 is a flowchart showing the latter half portion of a routine for calculating a stability factor Kh by estimation in a fifth embodiment of the turning characteristic estimation device according to the present invention which is configured as a modification of the first embodiment.

FIGS. 9 and 10 are flowcharts showing a main portion of the former half and the latter half, respectively, of a routine for calculating a stability factor Kh by estimation in a fifth embodiment of the turning characteristic estimation device according to the present invention which is configured as a modification of the first embodiment.

In this fifth embodiment, after completion of step 70, a decision is made as to whether or not the vehicle is under clockwise turning condition in step 72. If a positive decision is made, in steps 80-190, the control procedures same as in steps 80-190 in the first embodiment are executed for clockwise turning of the vehicle. To the contrary, if a negative decision is made, in steps 85-195, the control procedures same as in steps 80-190 in the first embodiment are executed for counter-clockwise turning of the vehicle.

That is, in step 80, a yaw rate deviation equivalent value Δδr converted to steered angle deviation is calculated in accordance with the under-mentioned equation 31 which corresponds to the above-mentioned equation 20, the value being derived for the clockwise turn of the vehicle by converting the deviation between the band-pass filtered actual yaw rate γrbpf and the band-pass filtered transient yaw rate γtrrbpf to the steered angle deviation of the front wheels.

$$\Delta\delta r = (\gamma trrbpf - \gamma rbpf)\frac{L}{V} \quad (31)$$

In step 90, high-pass filtering procedures are conducted on the first order delay filtered vehicle lateral acceleration Gyft which was calculated in step 70 and the equivalent value Δδr converted to steered angle deviation of the front wheels which was calculated in step 80 to remove influences due to zero point offset in the sensors. In this connection, the high-pass filtering procedure may as well be, for example, a first-order high-pass filtering having a cut-off frequency of 0.2 Hz.

Similarly in the above-mentioned first embodiment, the vehicle lateral acceleration Gyft and the yaw rate deviation equivalent value Δδr converted to steered angle deviation of the front wheels which were high-pass filtered in step 90 are referred to a band-pass filtered vehicle lateral acceleration Gyftbpf and a band-pass filtered yaw rate deviation equivalent value Δδrbpf converted to steered angle deviation of the front wheels.

In step 110, a decision is made as to whether or not adjustments are to be executed on the present integrated values Δδra of the band-pass filtered yaw rate deviation equivalent value Δδrbpf converted to steered angle deviation of the front wheels and the present integrated values ΔGya of the band-pass filtered vehicle lateral acceleration Gyftbpf calculated in step 130 in previous cycle. If a negative decision is made, the control proceeds to step 130, while a positive decision is made, the control proceeds to step 120.

It is to be understood that a decision may be made that adjustments are to be executed on the integrated values Δδra and ΔGya when either of the under-mentioned (A1r) and (A2r) is satisfied. The condition (A2r) is decided whether or not it is satisfied when a time constant coefficient Tp of steering response is estimated and a time constant coefficient Tpr of steering response is set to the estimated value in step 50.

(A1r) The absolute value of the difference ΔKhr between the stability factor Khr when the integrated values Δδra and ΔGya were recently adjusted and the present stability factor Khr which was estimated in step 150 in previous cycle is higher than a reference value for the deviation of the stability factor.

(A2r) The absolute value of the difference ΔTpr between the time constant coefficient Tpr of steering response when the integrated values Δδra and ΔGya were recently adjusted and the time constant coefficient Tpr of steering response which was set in step 150 in the present cycle is higher than a reference value for the deviation of time constant coefficient of steering response.

In step 120, an adjust gain Gajr for clockwise turning is calculated in accordance with the under-mentioned equation 32 which corresponds to the above-mentioned equation 21.

$$Gajr = \text{MIN}\left(\text{MAX}\left(\frac{\Delta\delta amin}{|\text{present}\Delta\delta ra|}, \frac{\Delta Gyamin}{|\text{present}\Delta Gya|}\right), 1\right) \quad (32)$$

In addition, in step 120, an adjusted integrated value Δδra of yaw rate deviation equivalent value Δδrbpf and an adjusted integrated value ΔGya of vehicle lateral acceleration Gyftbpf are calculated in accordance with the under-mentioned equations 33 and 34, respectively.

$$\Delta\delta ra = \text{present } \Delta\delta ra \times Gajr \quad (33)$$

$$\Delta Gya = \text{present } \Delta Gya \times Gajr \quad (34)$$

In step 130, when the vehicle lateral acceleration Gyftbpf is positive, an integrated value Δδra of the front wheel steered angle deviation value Δδrbpf equivalent to yaw rate deviation and an integrated value ΔGya of the vehicle lateral acceleration Gyftbpf are calculated in accordance with the under-mentioned equations 35 and 36, respectively.

$$\Delta\delta ra = \text{present } \Delta\delta ra + \Delta\delta rbpf \quad (35)$$

$$\Delta Gya = \text{present } \Delta Gya + Gyftbpf \quad (36)$$

When the vehicle lateral acceleration Gyftbpf is not positive, an integrated value $\Delta\delta ra$ of the yaw rate deviation equivalent value $\Delta\delta rbpf$ and an integrated value $\Delta Gya$ of the vehicle lateral acceleration Gyftbpf are calculated in accordance with the under-mentioned equations 37 and 38, respectively.

$$\Delta\delta ra = \text{present } \Delta\delta ra - \Delta\delta rbpf \quad (37)$$

$$\Delta Gya = \text{present } \Delta Gya - Gyftbpf \quad (38)$$

In step 140, the integrated value $\Delta\delta ra$ of the yaw rate deviation equivalent value $\Delta\delta rbpf$ is divided by the integrated value $\Delta Gya$ of the vehicle lateral acceleration Gyftbpf to calculate a ratio of the integrated values $\Delta\delta ra/\Delta Gya$.

In step 150, an estimated value of stability factor Khr for clockwise turning is calculated in accordance with the under-mentioned equation 39 which corresponds to the above-mentioned equation 28.

$$Khr = Kh0 + (\Delta\delta ra/\Delta Gya)/L \quad (39)$$

In step 160, a first order low-pass filter procedure is conducted on the estimated value of stability factor Khr in accordance with the under-mentioned equation 40 which corresponds to the above-mentioned equation 29.

$$Khrlpf = \frac{1}{1+sTc} Khr \quad (40)$$

In step 160, a first order low-pass filter procedure is conducted on the absolute value of the difference between the estimated value of stability factor Khr and the low-pass filtered estimated value Khrlpf of stability factor Khr in accordance with the under-mentioned equation 41 to calculate a deviation $\Delta Khrlpf$ of the low-pass filtered estimated value of stability factor Khr. Further, an inverse number $1/\Delta Khrlpf$ of the deviation $\Delta Khrlpf$ is calculated as a convergence degree Ckhr of the estimated value of stability factor Khr for clockwise turning. That is, a convergence degree Ckhr of the estimated value of stability factor Khr for clockwise turning is calculated in accordance with the under-mentioned equation 42.

$$\Delta Khrlpf = \frac{1}{1+sTc}(|Khr - Khrlpf|) \quad (41)$$

$$Ckhr = (1+sTc)/(Khr - Khrlpf) \quad (42)$$

In step 170, a target yaw rate $\gamma ttr$ for clockwise turning which corresponds to the transient yaw rate $\gamma tr$ is calculated and the deviation between a detected yaw rate $\gamma$ and the target yaw rate $\gamma ttr$ is calculated as a yaw rate deviation $\Delta\gamma r$. In addition, the reference value $\gamma ro$ for vehicle motion control during clockwise turning based on the yaw rate deviation $\Delta\gamma r$ is calculated according to the map similar to FIG. 3 on the basis of the convergence degree Ckhr of the stability factor, whereby a dead zone of vehicle motion control is variably set for clockwise turning.

In step 180, a decision is made as to whether or not the estimated value of stability factor Khr is permitted to be stored in the EEPROM by deciding whether or not the convergence degree Ckhr of the stability factor is larger than a reference value (a positive value). If a negative decision is made, the control returns to step 20. If a positive decision is made, in step 190, the estimated value of stability factor Khr is stored in the EEPROM so as to renew the estimated value of stability factor Khr stored in the EEPROM.

In steps 85-195, the control procedures same as in steps 80-190 are executed for counter-clockwise turning of the vehicle by displacing "r" indicating clockwise turning with "l" indicating counter-clockwise turning.

Turning characteristic for clockwise turning and turning characteristic for counter-clockwise turning may be different from each other. For example, in the case where gravity center is not at the center in lateral direction of the vehicle due to the distribution situation of passengers or load, or gravity center moves so much in lateral direction of the vehicle due to getting on and off of passengers or loading and unloading of goods, turning characteristic differs according to turning direction of the vehicle.

According to the fifth embodiment, it is possible not only to achieve the same operation and effect as in the first embodiment, but also, for the reason that a time constant coefficient of steering response is estimated for each turning direction, to estimate stability factors Khr and Khl for both clockwise turning and counter-clockwise turning with high reliability even when turning characteristic differs according to turning direction of the vehicle.

Sixth Embodiment

Figure 11:
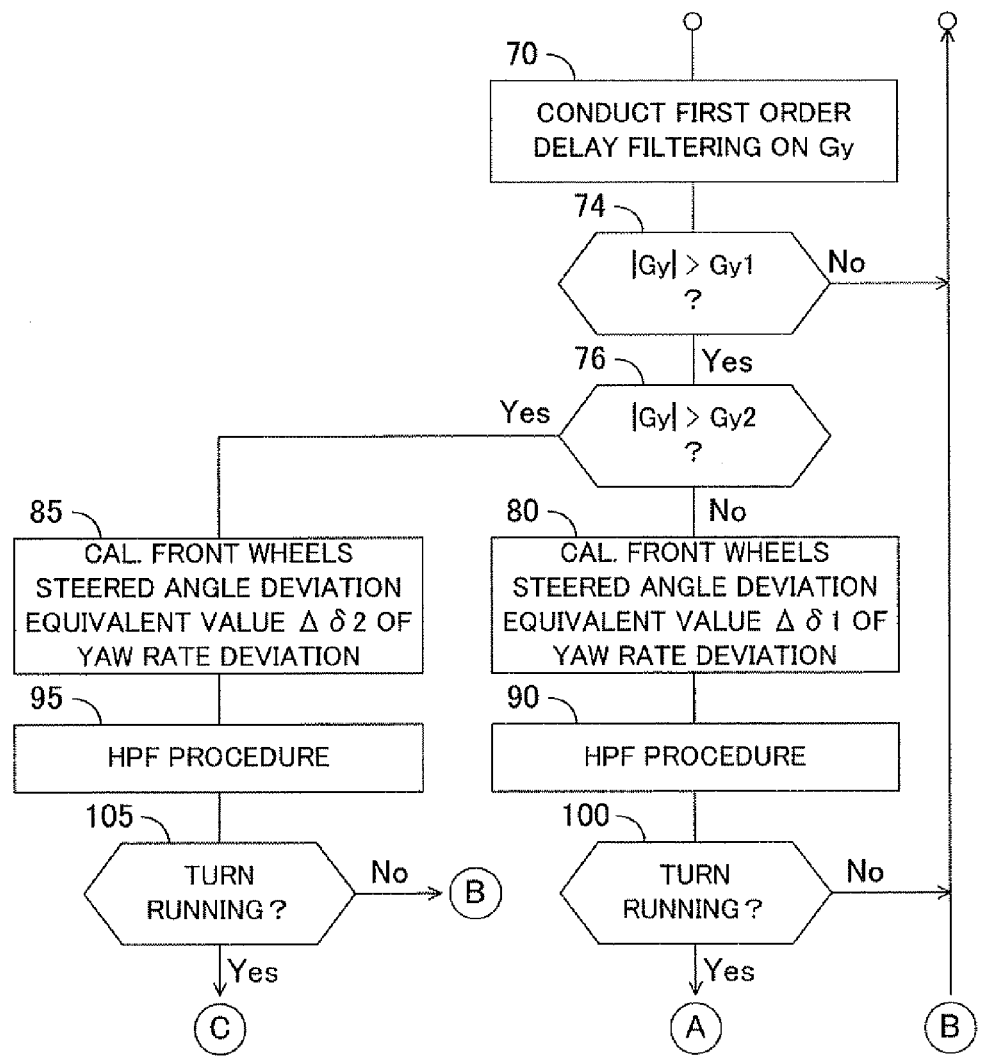
FIG. 11 is a flowchart showing former half portion of a routine for calculating a stability factor Kh by estimation in a sixth embodiment of the turning characteristic estimation device according to the present invention which is configured as a modification of the first embodiment.
Figure 12:
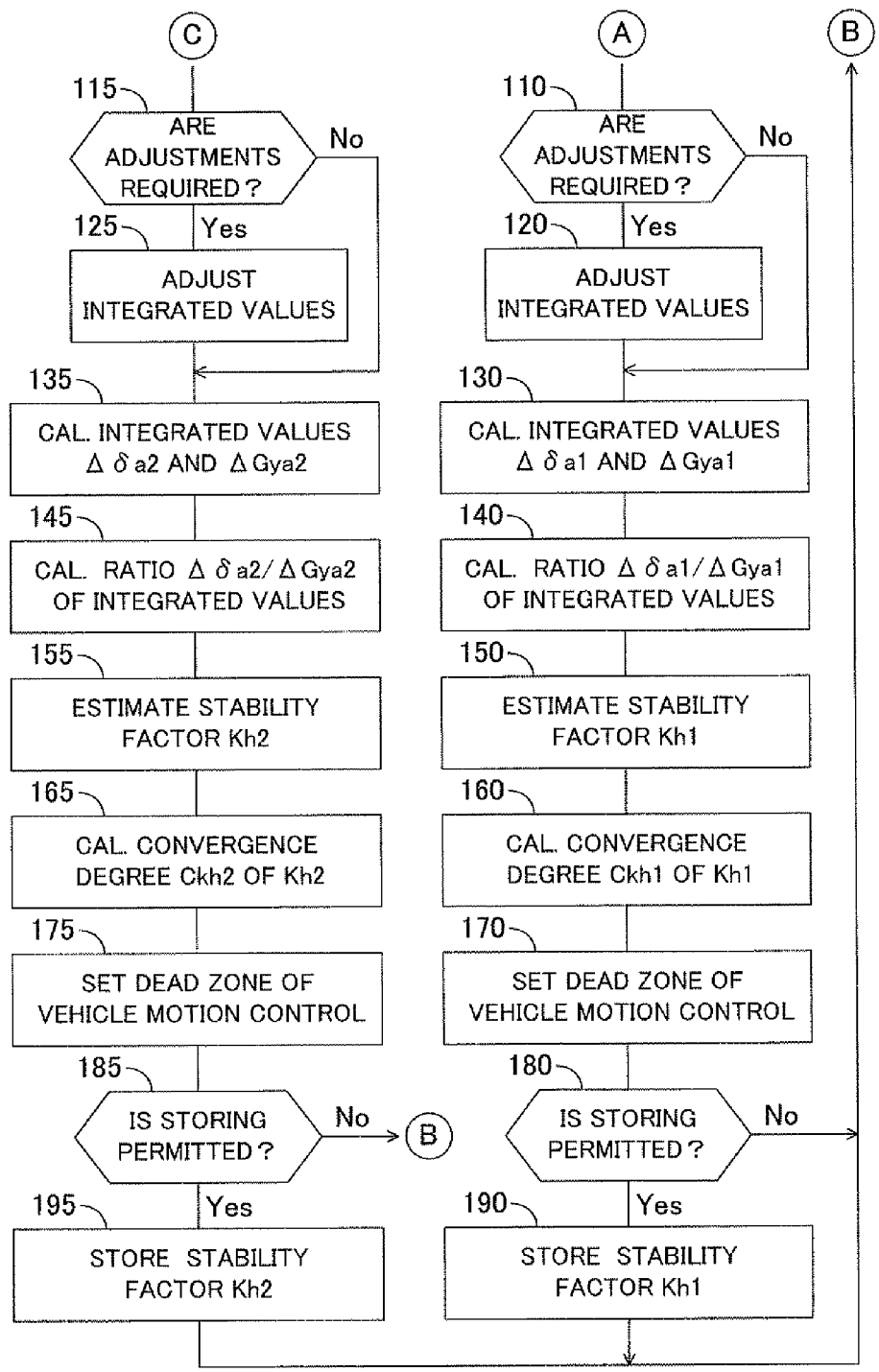
FIG. 12 is a flowchart showing former the latter half portion of a routine for calculating a stability factor Kh by estimation in a sixth embodiment of the turning characteristic estimation device according to the present invention which is configured as a modification of the first embodiment.

FIGS. 11 and 12 are flowcharts showing a main portion of the former half and the latter half, respectively, of a routine for calculating a stability factors Kh by estimation in a sixth embodiment of the turning characteristic estimation device according to the present invention which is configured as a modification of the first embodiment.

In this sixth embodiment, after completion of step 70, in step 74, a decision is made as to whether or not the absolute value of lateral acceleration Gy of the vehicle is larger than a first reference value Gy1 (a positive constant). If a negative decision is made, the control returns to step 20. If a positive decision is made, the control proceeds to step 76.

In step 76, a decision is made as to whether or not the absolute value of lateral acceleration Gy of the vehicle is larger than a second reference value Gy2 (a positive constant larger than the first reference value Gy1). If a negative decision is made, in steps 80-190, the control procedures same as in steps 80-190 in the first embodiment are executed for the case where the absolute value of lateral acceleration Gy of the vehicle is larger than the first reference value Gy1 and smaller than the second reference value Gy2 (a first area of lateral acceleration Gy). To the contrary, if a positive decision is made, in steps 85-195, the control procedures same as in steps 80-190 in the first embodiment are executed for the case where the absolute value of lateral acceleration Gy of the vehicle is larger than the second reference value Gy2 (a second area of lateral acceleration Gy).

That is, in step 80, a yaw rate deviation equivalent value $\Delta\delta 1$ converted to steered angle deviation is calculated in accordance with the under-mentioned equation 43 which corresponds to the above-mentioned equation 20, the value being derived for the first area of lateral acceleration Gy by converting the deviation between the band-pass filtered actual yaw rate $\gamma rbpf$ and the band-pass filtered transient yaw rate $\gamma tr1bpf$ to the steered angle deviation of the front wheels.

$$\Delta\delta 1 = (\gamma tr1bpf - \gamma 1bpf)\frac{L}{V} \quad (43)$$

In step 90, high-pass filtering procedures are conducted on the first order delay filtered vehicle lateral acceleration Gyft which was calculated in step 70 and the equivalent value $\Delta\delta1$ converted to steered angle deviation of the front wheels which was calculated in step 80 to remove influences due to zero point offset in the sensors. In this connection, the high-pass filtering procedure may as well be, for example, a first-order high-pass filtering having a cut-off frequency of 0.2 Hz.

Similarly in the above-mentioned first embodiment, the vehicle lateral acceleration Gyft and the yaw rate deviation equivalent value $\Delta\delta1$ converted to steered angle deviation of the front wheels which were high-pass filtered in step 90 are referred to a band-pass filtered vehicle lateral acceleration Gyftbpf and a band-pass filtered yaw rate deviation equivalent value $\Delta\delta1bpf$ converted to steered angle deviation of the front wheels.

In step 110, a decision is made as to whether or not adjustments are to be executed on the present integrated values $\Delta\delta r1$ of the band-pass filtered yaw rate deviation equivalent value $\Delta\delta1bpf$ converted to steered angle deviation of the front wheels and the present integrated values $\Delta Gya$ of the band-pass filtered vehicle lateral acceleration Gyftbpf calculated in step 130 in previous cycle. If a negative decision is made, the control proceeds to step 130, while a positive decision is made, the control proceeds to step 120.

It is to be understood that a decision may be made that adjustments are to be executed on the integrated values $\Delta\delta1a$ and $\Delta Gya$ when either of the under-mentioned (A11) and (A21) is satisfied. The condition (A21) is decided whether or not it is satisfied when a time constant coefficient Tp of steering response is estimated and a time constant coefficient Tp1 of steering response is se to the estimated value in step 50.

(A11) The absolute value of the difference $\Delta Kh1$ between the stability factor Kh1 when the integrated values $\Delta\delta1a$ and $\Delta Gya$ were recently adjusted and the present stability factor Kh1 which was estimated in step 150 in previous cycle is higher than a reference value for the deviation of the stability factor.

(A21) The absolute value of the difference $\Delta Tp1$ between the time constant coefficient Tp1 of steering response when the integrated values $\Delta\delta1a$ and $\Delta Gya$ were recently adjusted and the time constant coefficient Tp1 of steering response which was set in step 150 in the present cycle is higher than a reference value for the deviation of time constant coefficient of steering response.

In step 120, an adjust gain Gaj1 for the first area of lateral acceleration Gy is calculated in accordance with the under-mentioned equation 44 which corresponds to the above-mentioned equation 21.

$$Gaj1 = \text{MIN}\left(\text{MAX}\left(\frac{\Delta\delta amin}{|\text{present}\Delta\delta1a|}, \frac{\Delta Gyamin}{|\text{present}\Delta Gya|}\right), 1\right) \quad (44)$$

In addition, in step 120, an adjusted integrated value $\Delta\delta1a$ of yaw rate deviation equivalent value $\Delta\delta1bpf$ and an adjusted integrated value $\Delta Gya$ of vehicle lateral acceleration Gyftbpf are calculated in accordance with the under-mentioned equations 45 and 46, respectively.

$$\Delta\delta1a = \text{present } \Delta\delta1a \times Gaj1 \quad (45)$$

$$\Delta Gya = \text{present } \Delta Gya \times Gaj1 \quad (46)$$

In step 130, when the vehicle lateral acceleration Gyftbpf is positive, an integrated value $\Delta\delta1a$ of the front wheel steered angle deviation value $\Delta\delta1bpf$ equivalent to yaw rate deviation and an integrated value $\Delta Gya$ of the vehicle lateral acceleration Gyftbpf are calculated in accordance with the under-mentioned equations 47 and 48, respectively.

$$\Delta\delta1a = \text{present } \Delta\delta1a + \Delta\delta1bpf \quad (47)$$

$$\Delta Gya = \text{present } \Delta Gya + Gyftbpf \quad (48)$$

When the vehicle lateral acceleration Gyftbpf is not positive, an integrated value $\Delta\delta1a$ of the yaw rate deviation equivalent value $\Delta\delta1bpf$ and an integrated value $\Delta Gya$ of the vehicle lateral acceleration Gyftbpf are calculated in accordance with the under-mentioned equations 49 and 50, respectively.

$$\Delta\delta1a = \text{present } \Delta\delta1a - \Delta\delta1bpf \quad (49)$$

$$\Delta Gya = \text{present } \Delta Gya - Gyftbpf \quad (50)$$

In step 140, the integrated value $\Delta\delta1a$ of the yaw rate deviation equivalent value $\Delta\delta1bpf$ is divided by the integrated value $\Delta Gya$ of the vehicle lateral acceleration Gyftbpf to calculate a ratio of the integrated values $\Delta\delta1a/\Delta Gya$.

In step 150, an estimated value of stability factor Khr for the first area of lateral acceleration Gy is calculated in accordance with the under-mentioned equation 51 which corresponds to the above-mentioned equation 28.

$$Kh1 = Kh0 + (\Delta\delta1a/\Delta Gya)/L \quad (51)$$

In step 160, a first order low-pass filter procedure is conducted on the estimated value of stability factor Kh1 in accordance with the under-mentioned equation 52 which corresponds to the above-mentioned equation 29.

$$Khrlpf = \frac{1}{1+sTc} Kh1 \quad (52)$$

In step 160, a convergence degree Ckh1 of the estimated value of stability factor Kh1 for the first area of lateral acceleration Gy is calculated in accordance with the under-mentioned equation 53 which corresponds to the above-mentioned equation 42.

$$Ckh1 = (1+sTc)/(Kh1-Kh1lpf) \quad (53)$$

In step 170, a target yaw rate $\gamma ttr$ for the first area of lateral acceleration Gy is calculated and the deviation between a detected yaw rate $\gamma$ and the target yaw rate $\gamma tt1$ is calculated as a yaw rate deviation $\Delta\gamma1$. In addition, the reference value $\gamma1o$ for vehicle motion control during clockwise turning based on the yaw rate deviation $\Delta\gamma1$ is calculated according to the map similar to FIG. 3 on the basis of the convergence degree Ckh1 of the stability factor, whereby a dead zone of vehicle motion control is variably set for the first area of lateral acceleration Gy.

In step 180, a decision is made as to whether or not the estimated value of stability factor Kh1 is permitted to be stored in the EEPROM by deciding whether or not the convergence degree Ckh1 of the stability factor is larger than a reference value (a positive value). If a negative decision is made, the control returns to step 20. If a positive decision is made, in step 190, the estimated value of stability factor Kh1 is stored in the EEPROM so as to renew the estimated value of stability factor Kh1 stored in the EEPROM.

In steps 85-195, the control procedures same as in steps 80-190 are executed for the second area of lateral acceleration Gy by displacing "1" indicating the first area of lateral acceleration Gy with "2" indicating the second area of lateral acceleration Gy.

In general, turning characteristic may change according to the magnitude of lateral acceleration Gy. According to the sixth embodiment, it is possible not only to achieve the same operation and effect as in the first embodiment, but also, for the reason that a stability factor Kh is estimated for each area of lateral acceleration Gy, to estimate a stability factor Kh with high accuracy for each area of lateral acceleration Gy even when lateral acceleration Gy varies so much in magnitude.

Seventh Embodiment

Figure 13:
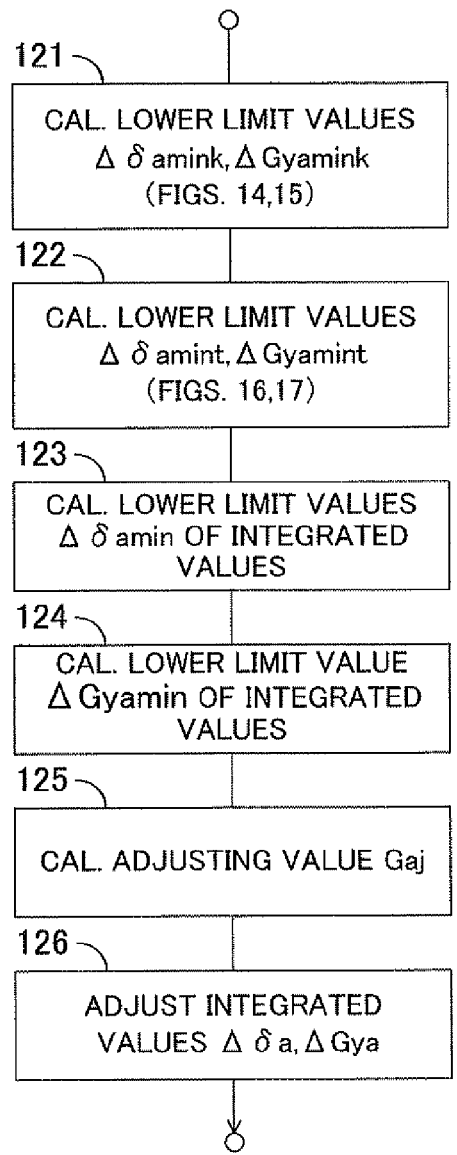
FIG. 13 is a flowchart showing a routine for calculating a stability factor Kh by estimation in a seventh embodiment of the turning characteristic estimation device according to the present invention.

FIG. 13 is a flowchart showing a main portion of a routine for calculating a stability factor Kh by estimation in a seventh embodiment of the turning characteristic estimation device according to the present invention.

In this seventh embodiment, if a positive decision is made in step 110, steps 121-126 shown in FIG. 13 are executed in place of step 120 in the first embodiment.

Figure 14:
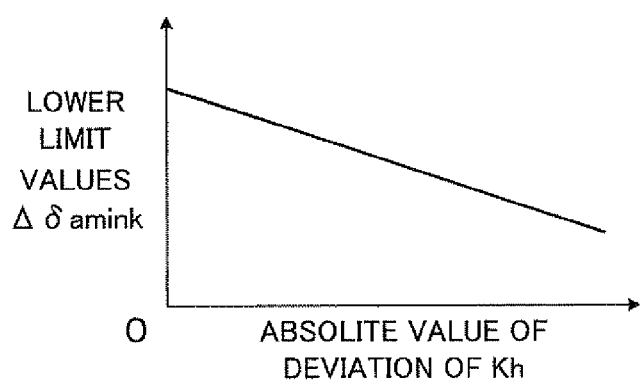
FIG. 14 is a graph showing a relationship between the absolute value of the deviation ΔKh of stability factor and a lower limit value Δδamink of integrated value.
Figure 15:
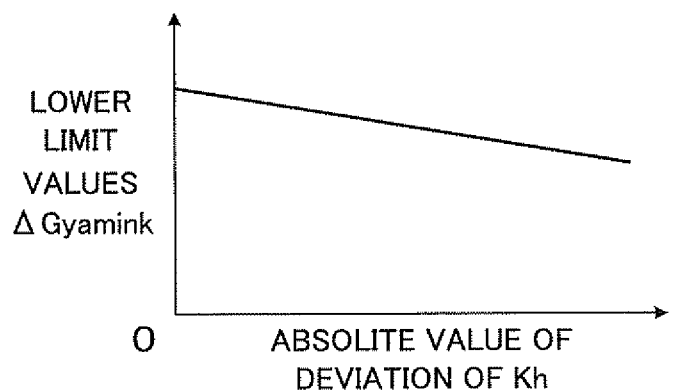
FIG. 15 is a graph showing a relationship between the absolute value of the deviation ΔKh of stability factor and a lower limit value ΔGyamink of integrated value.

In step 121, lower limit values $\Delta\delta$amink and $\Delta$Gyamink of the integrated values are calculated from maps corresponding to the graphs shown in FIGS. 14 and 15, respectively, on the basis of the absolute value of the deviation $\Delta$Kh of stability factor.

Figure 16:
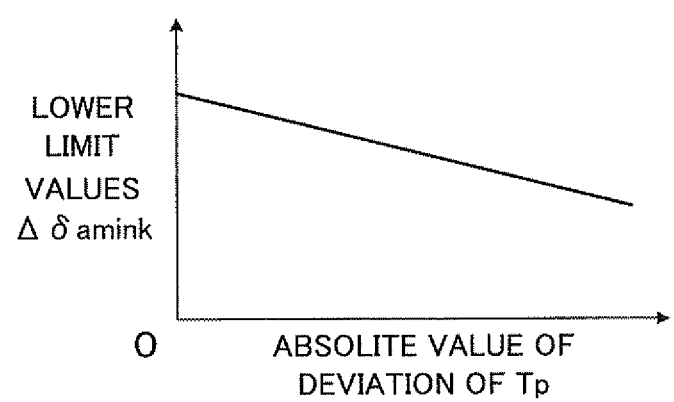
FIG. 16 is a graph showing a relationship between the absolute value of the deviation ΔTp of time constant coefficient of steering response and a lower limit value Δδamint of integrated value.
Figure 17:
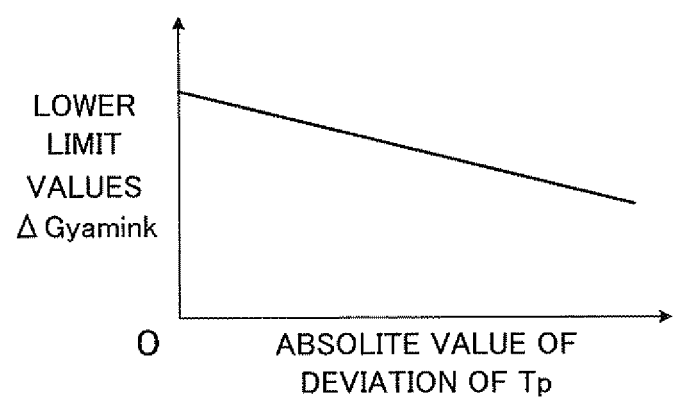
FIG. 17 is a graph showing a relationship between the absolute value of the deviation ΔTp of time constant coefficient of steering response and a lower limit value ΔGyamint of integrated value.
Figure 18:
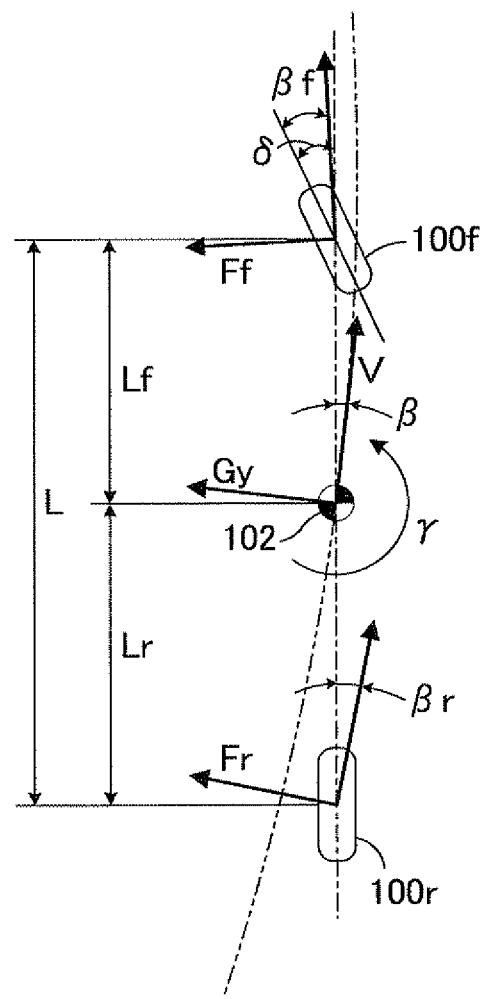
FIG. 18 is an explanatory diagram showing a two wheel model of a vehicle for estimating a stability factor.
Figure 19:
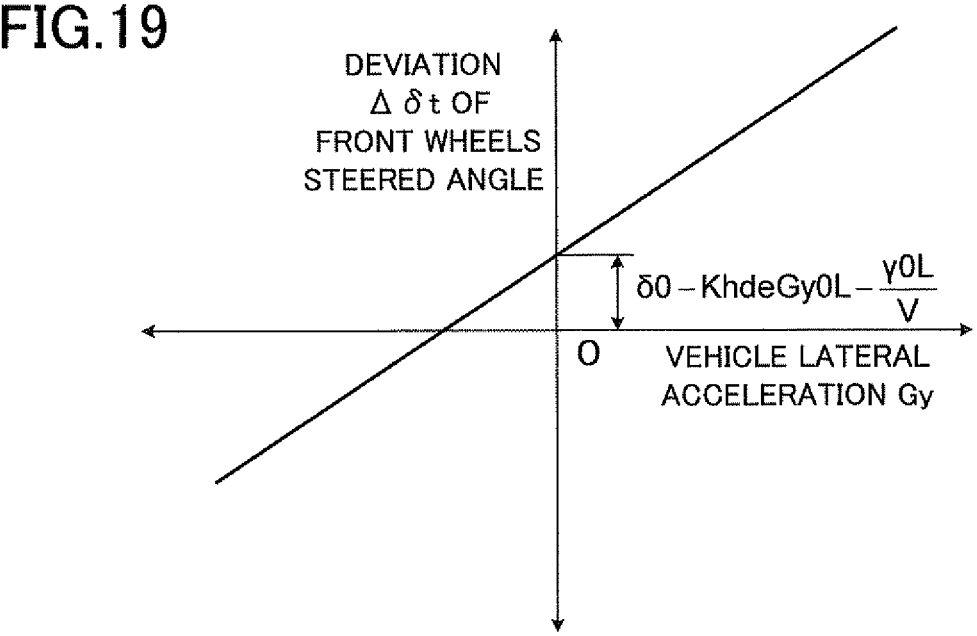
FIG. 19 is a graph showing a relationship between vehicle lateral acceleration Gy and front wheels steered angle deviation Δδt.
Figure 20:
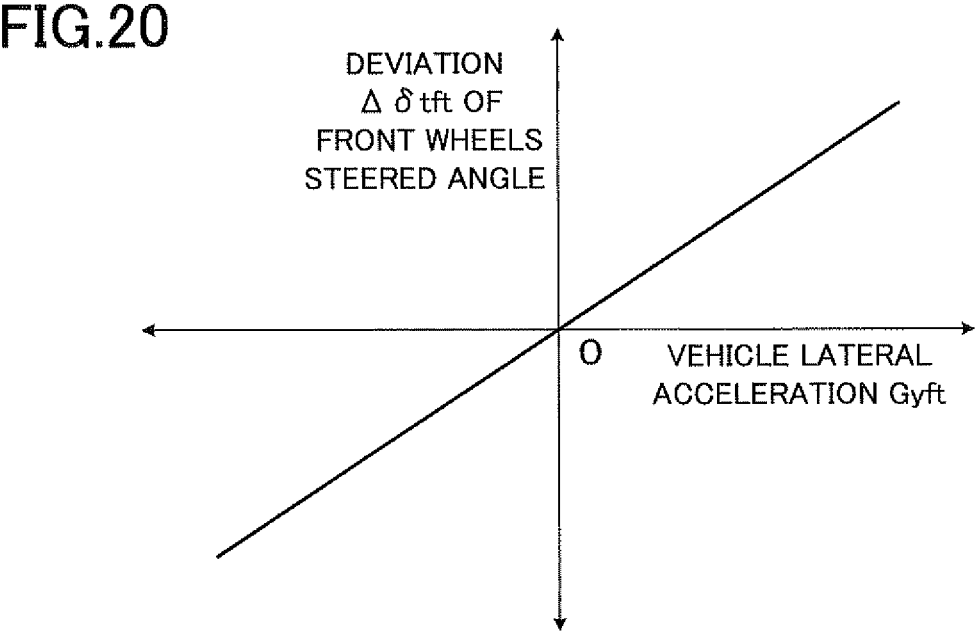
FIG. 20 is a graph showing a relationship between vehicle lateral acceleration Gyft removed of the components having frequency equal to or lower than a first predetermined value and front wheels steered angle deviation Δδtft removed of the components having frequency equal to or lower than a second predetermined value.

In step 122, lower limit values $\Delta\delta$amint and $\Delta$Gyamint of the integrated values are calculated from maps corresponding to the graphs shown in FIGS. 16 and 17, respectively, on the basis of the absolute value of the deviation $\Delta$Tp of time constant coefficient of steering response.

In step 123, a lower limit value $\Delta\delta$amin of the integrated values is set to larger one of the lower limit value $\Delta\delta$amink of the integrated value based on the absolute value of the deviation $\Delta$Kh of stability factor and the lower limit value $\Delta\delta$amint of the integrated value based on the absolute value of the deviation $\Delta$Tp of time constant coefficient of steering response.

In step 124, a lower limit value $\Delta$Gyamin of the integrated values is set to larger one of the lower limit value $\Delta$Gyamink of the integrated value based on the absolute value of the deviation $\Delta$Kh of stability factor and the lower limit value $\Delta$Gyamint of the integrated value based on the absolute value of the deviation $\Delta$Tp of time constant coefficient of steering response.

In step 125, an adjusting gain Gaj is calculated in accordance with the above-mentioned equation 21 on the basis of the lower limit values $\Delta\delta$amin and $\Delta$Gyamin of the integrated values.

In step 126, an adjusted integrated value $\Delta\delta$a of yaw rate deviation equivalent value $\Delta\delta$bpf and an adjusted integrated value $\Delta$Gya of vehicle lateral acceleration Gyftbpf are calculated in accordance with the above-mentioned equations 22 and 23, respectively.

In the above-mentioned first embodiment, an adjust gain Gaj for adjusting the integrated values $\Delta\delta$a and $\Delta$Gya is calculated in accordance with the equation 21 in which the lower limit values $\Delta\delta$amin and $\Delta$Gyamin are constant. Accordingly, if the lower limit values $\Delta\delta$amin and $\Delta$Gyamin are set to small values so that the integrated values $\Delta\delta$a and $\Delta$Gya are reliably decreased, there arises a risk that the integrated values Ma and $\Delta$Gya are excessively decreased under the situation where the deviation $\Delta$Kh of stability factor and the deviation $\Delta$Tp of time constant coefficient of steering response are small in magnitude. To the contrary, if the lower limit values $\Delta\delta$amin and $\Delta$Gyamin are set to large values, there arises a risk that the integrated values $\Delta\delta$a and $\Delta$Gya are insufficiently decreased and the influences by the previous integrated values $\Delta\delta$a and $\Delta$Gya can not effectively be reduced under the situation where the deviation $\Delta$Kh of stability factor and the deviation $\Delta$Tp of time constant coefficient of steering response are large in magnitude.

In contrast, according to the seventh embodiment, the lower limit values $\Delta\delta$amin and $\Delta$Gyamin of the integrated values are variably be set in accordance with the magnitude of the deviation $\Delta$Kh of stability factor and the deviation $\Delta$Tp of time constant coefficient of steering response so that when the deviation $\Delta$Kh of stability factor and the deviation $\Delta$Tp of time constant coefficient of steering response are large in magnitude, the lower limit values $\Delta\delta$amin and $\Delta$Gyamin of the integrated values are smaller as compared with the case where the deviation $\Delta$Kh of stability factor and the deviation $\Delta$Tp of time constant coefficient of steering response are small in magnitude.

Therefore, according to the seventh embodiment, the risk can be reduced that the integrated values $\Delta\delta$a and $\Delta$Gya are excessively decreased under the situation where the deviation $\Delta$Kh of stability factor and the deviation $\Delta$Tp of time constant coefficient of steering response are small in magnitude. To the contrary, the integrated values $\Delta\delta$a and $\Delta$Gya can sufficiently be decreased and the influences by the previous integrated values $\Delta\delta$a and $\Delta$Gya can effectively be reduced under the situation where the deviation $\Delta$Kh of stability factor and the deviation $\Delta$Tp of time constant coefficient of steering response are large in magnitude.

In general, if an adjusting gain Gaj is too small, S/N ratio in estimating stability factor is liable to be lowered. According to the seventh embodiment, a lower limit value $\Delta\delta$amin of the integrated values is set to larger one of the lower limit value $\Delta\delta$amink of the integrated value and the lower limit value $\Delta\delta$amint of the integrated value, and a lower limit value $\Delta$Gyamin of the integrated values is set to larger one of the lower limit value $\Delta$Gyamink of the integrated value and the lower limit value $\Delta$Gyamint of the integrated value. Accordingly, S/N ratio in estimating stability factor can be enhanced as compared with the case where a lower limit value $\Delta\delta$amin of the integrated values is set to smaller one of the lower limit value $\Delta\delta$amink of the integrated value and the lower limit value $\Delta\delta$amint of the integrated value, and a lower limit value $\Delta$Gyamin of the integrated values is set to smaller one of the lower limit value $\Delta$Gyamink of the integrated value and the lower limit value $\Delta$Gyamint of the integrated value.

In contrast, if an adjusting gain Gaj is too large, an error in estimating in estimating stability factor is liable to be increased. Accordingly, as long as a lower limit value $\Delta\delta$amin of the integrated values is set based on the lower limit value $\Delta\delta$amink of the integrated value and the lower limit value $\Delta\delta$amint of the integrated value, and a lower limit value $\Delta$Gyamin of the integrated values is set based on the lower limit value $\Delta$Gyamink of the integrated value and the lower limit value $\Delta$Gyamint of the integrated value, lower limit values of the integrated values may be set to smaller one ro the average of the associated lower limit values of the integrated values.

It is to be noted that although lower limit values $\Delta\delta$mink and $\Delta$Gyamink of the integrated values are calculated from the maps on the basis of the absolute value of the deviation $\Delta$Kh of stability factor, and lower limit values $\Delta\delta$amint and $\Delta$Gyamint of the integrated values are calculated from the maps on the basis of the absolute value of the deviation $\Delta$Tp of time constant coefficient of steering response, they may be calculated by a function of the absolute value of the deviation $\Delta$Kh of stability factor and the absolute value of the deviation $\Delta$Tp of time constant coefficient of steering response, respectively.

While the present invention has been described in detail with reference to the above particular embodiments, it will be apparent to those skilled in the art that the present invention is not limited thereto, but may be embodied in various other forms without departing from the scope of the invention.

For example, in the above-described first to sixth embodiments, in step 160, a convergence degree of the estimated value of stability factor is calculated and in step 170, a dead zone of vehicle motion control is variably set in accordance with the convergence degree. However, variable setting of a dead zone of vehicle motion control in accordance with the convergence degree may be omitted.

In the above-described first to sixth embodiments, in step 80, an equivalent value converted to steered angle deviation of the front wheels is calculated which is derived by converting the deviation between the transient yaw rate γtr and the actual yaw rate γ to the steered angle deviation of the front wheels. However, a high-pass filtering procedure may be conducted on the deviation between the transient yaw rate γtr and the actual yaw rate γ to calculate a band-pass filtered yaw rate deviation Δγbpf; a ratio of the yaw rate deviation Δγbpf relative to the integrated value ΔGya of the vehicle lateral acceleration Gyftbpf may be calculated in place of the ratio of the integrated values Δδa/ΔGya; and an estimated value of stability factor Kh may be calculated in accordance with the under-mentioned equation 54 on the basis of the ratio of the integrated values Δγbpf/ΔGya.

$$Kh = Kh0 + (\Delta\gamma bpf/\Delta Gya)/L \tag{54}$$

When an estimated value of stability factor Kh is calculated in accordance with the equation 54, it is preferable to set a plurality of vehicle speed areas and to calculate estimated value of stability factor for each vehicle speed area. It is also preferable to calculate convergence degree of estimated value of stability factor for each vehicle speed area and to set a dead zone of vehicle motion control for each vehicle speed area. Further, it is preferable to set stability factor Kh which is used to calculate a target yaw rate in vehicle motion control to an estimated value for each vehicle speed area.

In the above-described first to sixth embodiments, an adjust gain Gaj is calculated to larger one of the first gain (Δδamin/|presentΔδa|) and the second gain (ΔGyamin/|presentΔGya|) within a rage not larger than 1. However, one of the first and the second gain may be omitted and the other of the first and the second gain may be set to an adjust gain Gaj.

In the above-described sixth embodiment, stability factor Kh is estimated for the first and second areas having different lateral acceleration Gy in magnitude. However, stability factor Kh may be estimated for three or more areas having different lateral acceleration Gy in magnitude.

While the above-described fifth and sixth embodiments are configured as a modification of the first embodiment, the configuration of the fifth or sixth embodiment may be adapted to any one of the second to forth embodiments. Similarly, the above-described seventh embodiment is configured as a modification of the first embodiment, the configuration of the seventh embodiment may be adapted to any one of the second to sixth embodiments.

The invention claimed is:

1. A turning characteristic estimation device for a vehicle, wherein the device includes a computer which estimates a stability factor of the vehicle on the basis of the relationship between vehicle lateral acceleration removed of the components having frequency equal to or lower than a first predetermined value and a yaw rate deviation index value removed of the components having frequency equal to or lower than a second predetermined value which indexes the deviation between a transient yaw rate of the vehicle having a relationship of first order delay relative to a standard yaw rate of the vehicle and an actual yaw rate of the vehicle.

2. A turning characteristic estimation device for a vehicle according to claim 1, wherein said device acquires information of vehicle lateral acceleration and yaw rate deviation index value over a plurality of times and estimates a stability factor of the vehicle on the basis of the relationship between an integrated value of vehicle lateral acceleration removed of the components having frequency equal to or lower than a first predetermined value and an integrated value of yaw rate deviation index value removed of the components having frequency equal to or lower than a second predetermined value.

3. A turning characteristic estimation device for a vehicle according to claim 2, wherein said device calculates a first adjusting gain in accordance with the change degree of the estimated value of stability factor; sets a sum of a previous integrated value of vehicle lateral acceleration multiplied by the first gain and vehicle lateral acceleration acquired this time to the present integrated value of yaw rate deviation index value; and estimates a stability factor of the vehicle on the basis of the relationship between the present integrated value of vehicle lateral acceleration and the present integrated value of yaw rate deviation index value.

4. A turning characteristic estimation device for a vehicle according to claim 2, wherein said device estimates a time constant coefficient of steering response which is a coefficient multiplied to a vehicle speed in a time constant of the first order delay on the basis of the relationship between transient yaw rate of the vehicle and actual yaw rate of the vehicle so that transient yaw rate of the vehicle approaches actual yaw rate of the vehicle; calculates a second adjusting gain in accordance with the change degree of the estimated value of time constant coefficient of steering response; sets a sum of a previous integrated value of vehicle lateral acceleration multiplied by the second gain and vehicle lateral acceleration acquired this time to the present integrated value of vehicle lateral acceleration; sets a sum of a previous integrated value of yaw rate deviation index value multiplied by the second gain and yaw rate deviation index value acquired this time to the present integrated value of yaw rate deviation index value; and estimates a stability factor of the vehicle on the basis of the relationship between the present integrated value of vehicle lateral acceleration and the present integrated value of yaw rate deviation index value.

5. A turning characteristic estimation device for a vehicle according to claim 2, wherein said device calculates a first adjusting gain in accordance with the change degree of the estimated value of stability factor; estimates a time constant coefficient of steering response which is a coefficient multiplied to a vehicle speed in a time constant of the first order delay on the basis of the relationship between transient yaw rate of the vehicle and actual yaw rate of the vehicle so that transient yaw rate of the vehicle approaches actual yaw rate of the vehicle; calculates a second adjusting gain in accordance with the change degree of the estimated value of time constant coefficient of steering response; determines a final adjusting gain on the basis of the first and the second adjusting gains; sets a sum of a previous integrated value of vehicle lateral acceleration multiplied by the final gain and vehicle lateral acceleration acquired this time to the present integrated value of vehicle lateral acceleration; sets a sum of a previous integrated value of yaw rate deviation index value multiplied by the final gain and yaw rate deviation index value acquired this time to the present integrated value of yaw rate deviation index value; and estimates a stability factor of the vehicle on the basis of the relationship between the present integrated value of vehicle lateral acceleration and the present integrated value of yaw rate deviation index value.

6. A turning characteristic estimation device for a vehicle according to claim 1, wherein said yaw rate deviation index value is calculated as a value in which the difference between transient yaw rate and actual yaw rate is transferred to steered angle deviation of the front wheels.

7. A turning characteristic estimation device for a vehicle according to claim 1, wherein said device varies said first prescribed frequency and/or said second prescribed frequency according to an index value of the number of reciprocating steering operations by a driver per unit time.

8. A turning characteristic estimation device for a vehicle according to claim 1, wherein said device varies said first prescribed frequency and/or said second prescribed frequency according to a magnitude of lateral acceleration of the vehicle.

9. A turning characteristic estimation device for a vehicle according to claim 1, wherein said device estimates a stability factor of the vehicle individually for clockwise turning and counter-clockwise turning.

10. A turning characteristic estimation device for a vehicle according to claim 1, wherein said device estimates a stability factor of the vehicle individually for each area of lateral acceleration of the vehicle.

11. A turning characteristic estimation device for a vehicle according to claim 3, wherein said device adds an adjustment value of stability factor based on the relationship between the integrated value of vehicle lateral acceleration and the integrated value of yaw rate deviation index value to an initial value of stability factor utilized in calculation of the transient yaw rate of the vehicle to calculate the estimated value of stability factor.

12. A vehicle motion controller for executing a vehicle motion control utilizing a stability factor estimated by the device according to claim 1, wherein said vehicle motion controller varies a dead zone of said vehicle motion control in accordance with a convergence degree of the estimated value of stability factor.

* * * * *